(12) United States Patent
Yabe et al.

(10) Patent No.: US 11,704,854 B2
(45) Date of Patent: Jul. 18, 2023

(54) INFORMATION PROCESSING SYSTEM, INFORMATION PROCESSING METHOD, AND COMPUTER PROGRAM

(71) Applicant: GREE, Inc., Tokyo (JP)

(72) Inventors: Ryo Yabe, Tokyo (JP); Motoki Uchida, Tokyo (JP); Seiji Ochiai, Tokyo (JP); Aya Kurabuchi, Tokyo (JP)

(73) Assignee: GREE, Inc., Tokyo (JP)

( * ) Notice: Subject to any disclaimer, the term of this patent is extended or adjusted under 35 U.S.C. 154(b) by 0 days.

(21) Appl. No.: 17/586,188

(22) Filed: Jan. 27, 2022

(65) Prior Publication Data

US 2022/0237844 A1  Jul. 28, 2022

(30) Foreign Application Priority Data

Jan. 27, 2021 (JP) .................................. 2021-010721
Sep. 3, 2021 (JP) .................................. 2021-143633

(51) Int. Cl.
| | |
|---|---|
| *G06T 13/40* | (2011.01) |
| *G06T 13/80* | (2011.01) |
| *G06F 3/0482* | (2013.01) |
| *H04L 65/60* | (2022.01) |
| *A63F 13/655* | (2014.01) |
| *A63F 13/533* | (2014.01) |
| *G06F 3/04817* | (2022.01) |

(52) U.S. Cl.
CPC ............ *G06T 13/40* (2013.01); *G06F 3/0482* (2013.01); *G06T 13/80* (2013.01); *A63F 13/533* (2014.09); *A63F 13/655* (2014.09); *A63F 2300/308* (2013.01); *A63F 2300/695* (2013.01); *G06F 3/04817* (2013.01); *G06T 2200/24* (2013.01); *H04L 65/60* (2013.01)

(58) Field of Classification Search
CPC ..................................................... G06T 13/40
See application file for complete search history.

(56) References Cited

U.S. PATENT DOCUMENTS 10,848,445 B1 * 11/2020 Willmann ............. H04L 51/046
2022/0161133 A1 * 5/2022 Kamiguchi ........... A63F 13/533

FOREIGN PATENT DOCUMENTS

JP 2015-184689 A 10/2015

* cited by examiner

*Primary Examiner* — Roland J Casillas
(74) *Attorney, Agent, or Firm* — Maier & Maier, PLLC

(57) ABSTRACT

An information processing system, a method, and a computer program capable of improving a motivation to view and/or distribute a moving image may be provided herein, which may include a distribution unit for distributing a moving image, a first selection reception unit for receiving selection of at least one object from a plurality of objects corresponding to each of a plurality of character objects, a second selection reception unit for receiving selection of at least one object from a plurality of objects, a specification unit for specifying a performing user associated with a character object corresponding to an object receiving most selections by the first selection reception unit and the second selection reception unit, an association unit for associating a specific object, and a display processing unit for generating information for displaying a specific object associated by the association unit in association with a character object.

19 Claims, 23 Drawing Sheets

FIG.36

| IDENTIFICATION NUMBER | FIRST PART |
|---|---|
| 100001 | START WITH "A" |
| 100002 | START WITH "I" |
| 100003 | START WITH "U" |
| ... | ... |
| 100013 | START WITH "SU" |
| ... | ... |
| 100100 | CHRISTMAS |
| ... | ... |

FIG.37

| IDENTIFICATION NUMBER | SECOND PART |
|---|---|
| 200001 | DELICIOUS FOOD |
| 200002 | SOUR FOOD |
| 200003 | CUTE THING |
| ... | ... |

INFORMATION PROCESSING SYSTEM, INFORMATION PROCESSING METHOD, AND COMPUTER PROGRAM

FIELD

The present invention relates to an information processing system, an information processing method, and a computer program.

BACKGROUND ART

A known information processing system may generate an animation of a character object based on movement of an actor and distribute a moving image containing the animation of the character object (for example, see Patent Literature Patent Literature 1, referenced above, is Japanese Patent Application JP-A-2015-184689.

SUMMARY

An important issue in the present technical field is how to improve a motivation of a distributor to distribute the moving image and/or a motivation of a viewer to view the moving image.

Therefore, an object of the present disclosure is to provide a technical improvement that solves or alleviates at least some of the problems of the related art described above. One of more specific objects of the disclosure is to provide an information processing system, an information processing method, and a computer program capable of improving the motivation of the distributor to distribute the moving image and/or the motivation of the viewer to view the moving image.

An information processing system according to an exemplary embodiment of the disclosure may be an information processing system for distributing a moving image, the information processing system including one or a plurality of computer processors, in which the one or plurality of computer processors may be characterized by including a distribution unit for distributing a moving image containing a plurality of character objects associated with each of a plurality of performing users (for example, with one-for-one correspondence between objects and users), a first selection reception unit for receiving selection of at least one object from a plurality of objects corresponding to each of the plurality of character objects from a viewing user terminal of a viewing user viewing the moving image (for example, with one-for-one correspondence between objects and character objects), a second selection reception unit for receiving selection of at least one object from the plurality of objects from an performing user terminal of an performing user, a specification unit for specifying an performing user associated with a character object corresponding to an object receiving most selections by the first selection reception unit and the second selection reception unit, an association unit for associating a specific object with a character object associated with an performing user specified by the specification unit, and a display processing unit for generating information for displaying the specific object associated by the association unit in association with the character object.

The one or plurality of computer processors may further include a result display unit for displaying a result screen showing performing user information related to an performing user specified by the specification unit and selection user information related to a viewing user and/or an performing user selecting an object corresponding to a character object associated with the performing user.

The result display unit may display, as the selection user information, at least a part of an icon of a viewing user and/or an performing user selecting an object corresponding to a character object associated with the performing user, and the number of selected objects.

The one or plurality of computer processors may further include a generation unit for generating and displaying a first theme based on a request from an performing user terminal of a specific performing user among the plurality of performing users, an answer reception unit for receiving answers from performing user terminals of the plurality of performing users to a first theme displayed by the generation unit, and an answer display unit for displaying an answer received by the answer reception unit, in which the plurality of objects may be displayed at positions corresponding to answers displayed by the answer display unit.

The generation unit may generate at least the first theme using at least one of a first part extracted from a first database and including one or a plurality of clauses and a second part extracted from a second database and including one or a plurality of clauses.

The one or plurality of computer processors may further include a storage unit for storing information related to the plurality of performing users when the generation unit generates and displays the first theme based on a request from an performing user terminal of a specific performing user among the plurality of performing users.

After a result screen is displayed by the result display unit, when the generation unit generates and displays a second theme based on a request from an performing user terminal of the specific performing user, the storage unit may update information related to the plurality of performing users.

The one or plurality of computer processors may further include a posting unit for posting a result screen displayed by the result display unit to an external SNS service, in which the posting unit may post the result screen together with information related to the moving image.

The one or plurality of computer processors may further include a determination unit for determining whether or not there is one object receiving most selections by the first selection reception unit and the second selection reception unit, in which when the determination unit determines that there is one object having the most selections, the specification unit may specify one performing user associated with a character object associated with the one object having the most selections, and when the determination unit determines that there is a plurality of objects having the most selections, the specification unit may specify one performing user according to a predetermined priority from a plurality of performing users associated with character objects associated with the plurality of objects having the most selections.

The first selection reception unit and the second selection reception unit may start receiving the selection in response to a start request from an performing user terminal of a specific performing user among the performing users, and end receiving the selection in response to an end request from the performing user terminal of the specific performing user.

The plurality of objects may move in association with movement of the plurality of character objects.

The plurality of performing users may include a host user distributing the moving image and one or more guest users participating in the moving image, and the specific performing user may be the host user.

An information processing method according to an exemplary embodiment of the disclosure may be an information processing method in an information processing system for distributing a moving image, the information processing method being characterized by causing one or a plurality of computer processors included in the information processing system to execute a distribution step of distributing a moving image containing a plurality of character objects associated with a plurality of performing users, a first selection reception step of receiving selection of one object from a plurality of objects corresponding to each of the plurality of character objects from a viewing user terminal of a viewing user viewing the moving image, a second selection reception step of receiving selection of one object from the plurality of objects from an performing user terminal of each of the performing users, a specification step of specifying an performing user associated with a character object corresponding to an object receiving most selections in the first selection reception step and the second selection reception step, an association step of associating a specific object with a character object associated with an performing user specified in the specification step, and a display processing step of generating information for displaying the specific object associated in the association step in association with the character object.

An information processing method according to an exemplary embodiment of the disclosure may be an information processing method in a first information processing terminal included in an information processing system distributing a moving image, the information processing method being characterized by causing one or a plurality of computer processors included in the first information processing terminal to execute a distribution step of distributing a moving image containing a plurality of character objects associated with a plurality of performing users, a storage step of storing information related to the plurality of performing users, a specification step of specifying an performing user associated with a character object corresponding to an object having most selections of one object from a plurality of objects corresponding to each of the plurality of character objects from a viewing user terminal of a viewing user viewing the moving image and most selections of one object from the plurality of objects from performing user terminals of the performing users, an association step of associating a specific object with a character object associated with an performing user specified in the specification step, and a display processing step of generating information for displaying the specific object associated in the association step in association with the character object.

A computer program according to an exemplary embodiment of the disclosure may be a computer program executed in a first information processing terminal included in an information processing system distributing a moving image, the computer program being characterized by causing one or a plurality of computer processors included in the first information processing terminal to implement a distribution function of distributing a moving image containing a plurality of character objects associated with a plurality of performing users, a storage function of storing information related to the plurality of performing users, a specification function of specifying an performing user associated with a character object corresponding to an object having most selections of one object from a plurality of objects corresponding to each of the plurality of character objects from a viewing user terminal of a viewing user viewing the moving image and most selections of one object from the plurality of objects from performing user terminals of the performing users, an association function of associating a specific object with a character object associated with an performing user specified by the specification function, and a display processing function of generating information for displaying the specific object associated by the association function in association with the character object.

An information processing method according to an exemplary embodiment of the disclosure may be an information processing method in a second information processing terminal included in an information processing system distributing a moving image, the information processing method being characterized by causing one or a plurality of computer processors included in the second information processing terminal to execute a first display step of displaying a moving image containing at least one character object associated with at least one performing user, an appearance step of causing a character object to appear in a moving image displayed in the first display step, a transmission step of transmitting selection of one object from a plurality of objects corresponding to each of character objects associated with a plurality of performing users, and a second display step of displaying a moving image in which a specific object is associated with a character object corresponding to an object having most selections of one object from a plurality of objects corresponding to each of the plurality of character objects from a viewing user terminal of a viewing user viewing the moving image and most selections of one object from the plurality of objects from performing user terminals of the performing users.

A computer program according to an exemplary embodiment of the disclosure may be a computer program executed in a second information processing terminal included in an information processing system distributing a moving image, the computer program being characterized by causing one or a plurality of computer processors included in the second information processing terminal to implement a first display function of displaying a moving image containing at least one character object associated with at least one performing user, an appearance function of causing a character object to appear in a moving image displayed in the first display function, a transmission function of transmitting selection of one object from a plurality of objects corresponding to each of character objects associated with a plurality of performing users, and a second display function of displaying a moving image in which a specific object is associated with a character object corresponding to an object having most selections of one object from a plurality of objects corresponding to each of the plurality of character objects from a viewing user terminal of a viewing user viewing the moving image and most selections of one object from the plurality of objects from performing user terminals of the performing users.

An information processing method according to an exemplary embodiment of the disclosure may be an information processing method in a third information processing terminal included in an information processing system distributing a moving image, the information processing method being characterized by causing one or a plurality of computer processors included in the third information processing terminal to execute a first display step of displaying a moving image containing a plurality of character objects associated with a plurality of performing users, a transmission step of transmitting selection of one object from a plurality of objects corresponding to each of character objects associated with a plurality of performing users, and a second display step of displaying a moving image in which a specific object is associated with a character object corresponding to an object having most selections of one object from a plurality of objects corresponding to each of the plurality of character objects from a viewing user terminal of a viewing user viewing the moving image and most selections of one object from the plurality of objects from performing user terminals of the performing users.

A computer program according to an exemplary embodiment of the disclosure may be a computer program executed in a third information processing terminal included in an information processing system distributing a moving image, the computer program being characterized by causing one or a plurality of computer processors included in the third information processing terminal to implement a first display function of displaying a moving image containing a plurality of character objects associated with a plurality of performing users, a transmission function of transmitting selection of one object from a plurality of objects corresponding to each of character objects associated with a plurality of performing users, and a second display function of displaying a moving image in which a specific object is associated with a character object corresponding to an object having most selections of one object from a plurality of objects corresponding to each of the plurality of character objects from a viewing user terminal of a viewing user viewing the moving image and most selections of one object from the plurality of objects from performing user terminals of the performing users.

According to the present disclosure and the exemplary embodiments provided therein, it may be possible to provide a technical improvement that solves or alleviates at least some of the problems of the related art described above. Specifically, it may be possible to provide an information processing system, an information processing method, and a computer program capable of improving a motivation of a distributor to distribute the moving image and/or a motivation of a viewer to view the moving image.

BRIEF DESCRIPTION OF THE DRAWINGS

FIG. 36 is an image diagram of an exemplary embodiment of a data table stored in a first database in the disclosure;

FIG. 37 is an image diagram of an exemplary embodiment of a data table stored in a second database in the disclosure;

DETAILED DESCRIPTION

First, an outline of an information processing system according to an embodiment of the disclosure will be described with reference to the drawings.

The information processing system in the disclosure may be an information processing system that distributes moving images, and includes one or a plurality of computer processors. A description will be given on the assumption that the distributed moving image contains an animation of a character object generated based on movement of a distributing user. However, the invention is not limited thereto, and the moving image may be a moving image in which the character object generated based on the movement of the distributing user does not appear. For example, the moving image may be one in which the distributing user appears, or may be one in which audio of the distributing user and a predetermined video are reproduced, such as a karaoke moving image or a live game moving image. Further, as will be described later, the moving image may be one in which a character object is superimposed and displayed on a game screen and/or a captured picture in a real space.

Figure 1:
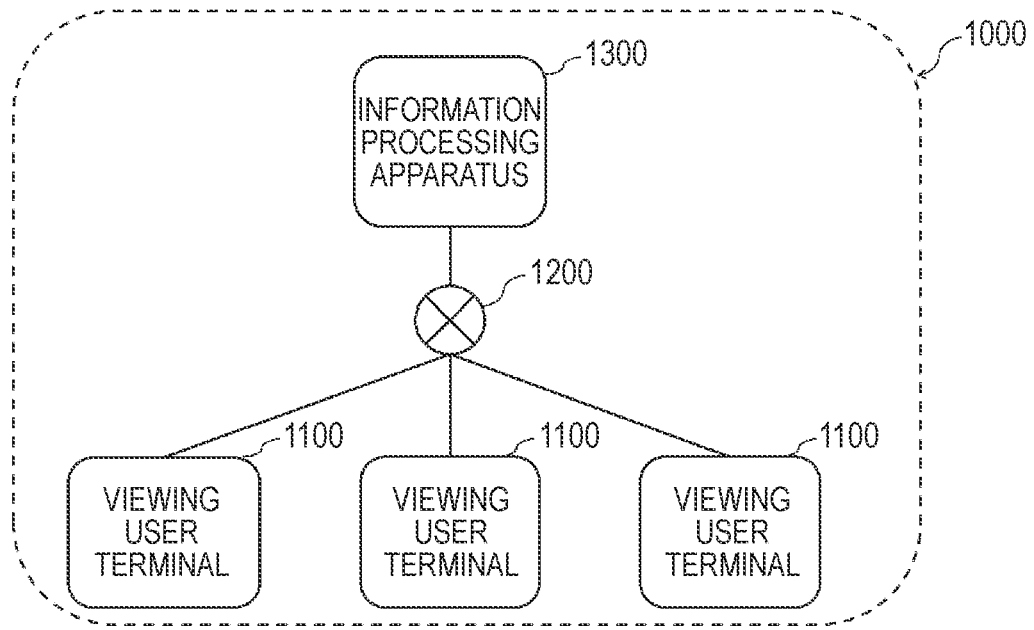
FIG. 1 is a system configuration diagram illustrating an exemplary embodiment of an information processing system in the disclosure.

As illustrated as an example in FIG. 1, an information processing system 1000 according to the disclosure may include one or more viewing user terminals 1100, and an information processing apparatus (support computer) 1300 disposed in a moving image distribution studio, etc., which may be connected to these viewing user terminals 1100 via a network 1200.

Further, the information processing apparatus 1300 may be connected to a server apparatus 1400 (not illustrated) via the Internet, and a part or all of processing to be performed by the information processing apparatus 1300 may be performed by the server apparatus 1400. Note that the server apparatus 1400 may be an information processing apparatus 2400 illustrated in FIG. 2.

In the present specification, the distribution by the information processing system 1000 may be referred to as studio distribution.

In studio distribution, movement of the entire body of the distributing user (actor) may be reflected in a character in real time by photographing a marker attached to the distributing user with a camera installed in a studio and using a known motion capture technology.

Figure 2:
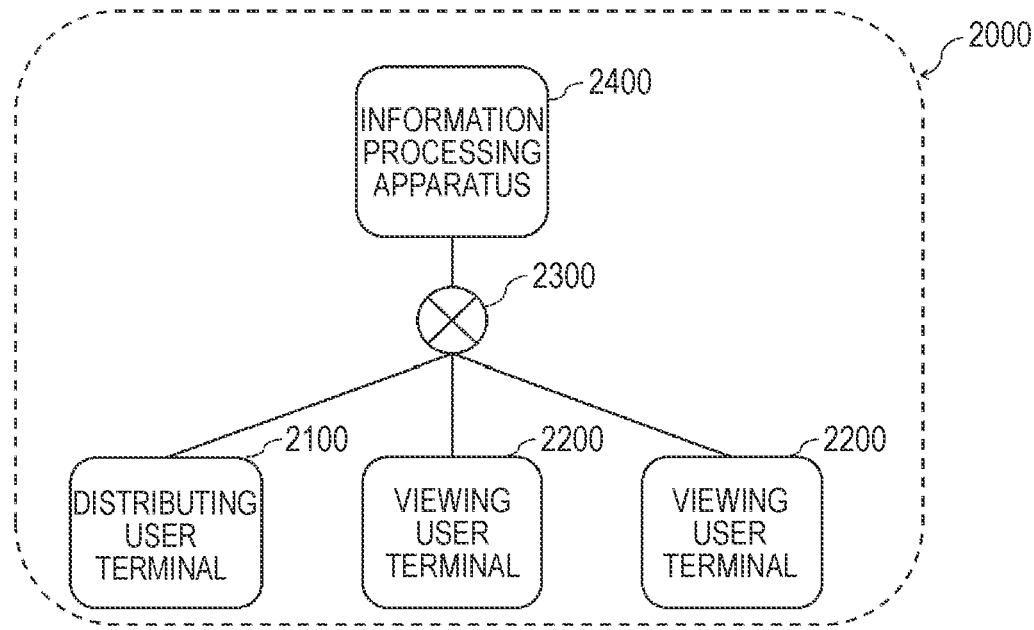
FIG. 2 is a system configuration diagram illustrating an exemplary embodiment of an information processing system in the disclosure.

Further, the information processing system 1000 of the invention can cooperate with another information processing system 2000 illustrated as an example in FIG. 2. The information processing system 2000 illustrated in FIG. 2 may include a distributing user terminal 2100, one or more viewing user terminals 2200, and an information processing apparatus (server apparatus) 2400 connected to the distributing user terminal 2100 and the viewing user terminals 2200 via a network 2300.

In the above example, the distributing user terminal 2100 may be an information processing terminal such as a smartphone. In the specification, distribution by the information processing system 2000 may be referred to as mobile distribution.

In mobile distribution, movement of a face of the distributing user may be reflected in a face of the character in real time by photographing the face of the distributing user with a camera included in the distributing user terminal 2100 and using a known face tracking technology.

As an example, a moving image generated by the information processing system 1000 and the information processing system 2000 can be distributed to a viewing user from one moving image distribution platform.

Further, in any of the distributions, a process of reflecting motion in a character to generate an animation, a process of displaying a gift described later, etc. may be shared and performed by the distributing user terminal, the viewing user terminal, the information processing apparatus, and other apparatuses.

Specifically, face motion data and audio data of the distributing user may be transmitted from the distributing user terminal to a terminal or apparatus that generates an animation of a character object. Further, body motion may be transmitted in addition to the face motion.

In the following description, it may be assumed that a process of generating an animation may be performed on each of the distributing user terminal and the viewing user terminal. However, the invention is not limited thereto.

Further, in the following description, it may be assumed that the information processing system in the disclosure has a system configuration (mobile distribution) illustrated in FIG. 2. However, the information processing system may have a system configuration illustrated in FIG. 1.

Note that there may be no particular distinction between a distributing user and a viewing user in mobile distribution, the viewing user can perform mobile distribution at any time, and the distributing user can be a viewing user when viewing a moving image of another distributing user.

Further, in the following description, it may be assumed that the information processing system in the disclosure has the system configuration (mobile distribution) illustrated in FIG. 2 and a system configuration illustrated in FIG. 3. An information processing system 3000 in the disclosure illustrated in FIG. 3 may include a first information processing terminal 100 (host user terminal), which may be a terminal of a host user, a second information processing terminal 110 (guest user terminal), which may be a terminal of one or more guest users, a third information processing terminal 200 (viewing user terminal), which may be a terminal of one or more viewing users, and an information processing apparatus (server apparatus) 400 connected to the first information processing terminal 100, one or more second information processing terminals 110, and one or more third information processing terminals 200 via a network 300. Note that in the disclosure, the first information processing terminal 100 and the one or more second information processing terminals 110 may be collectively referred to as an performing user terminal. In addition, the performing user terminal may correspond to the distributing user terminal 2100 in FIG. 2. The host user and guest user will be described together with a collaboration function described later.

Further, as described above, a moving image distributed by the information processing system in the disclosure may be a screen of a game played by the distributing user and/or a captured picture in the real space. At this time, a character object generated based on movement of the distributing user or a real picture of the distributing user may be displayed together with the game screen. Further, when the distributing user is included in the captured picture in the real space, the character object generated based on the movement of the distributing user may be superimposed and displayed on the real picture of the distributing user (augmented reality (AR)). Further, an animation of a gift object, etc. may be superimposed and displayed on the captured picture in the real space.

In the disclosure, the distributing user terminal, the viewing user terminal, the first information processing terminal, the second information processing terminal, and the third information processing terminal may be smartphones (multifunctional telephone terminals), tablet terminals, personal computers, console game machines, wearable computers such as head-mounted displays (HMDs) and eyeglass-type wearable terminals (AR glasses, etc.), and information processing apparatuses capable of reproducing moving images other than these apparatuses. Further, these terminals may be stand-alone apparatuses that operate independently, or may include a plurality of apparatuses connected to each other to be able to transmit and receive various data.

Here, an exemplary embodiment of a hardware configuration of the information processing apparatus 1300 included in the information processing system 3000 will be described with reference to FIG. 4. The information processing apparatus 1300 includes a processor 401, a memory 402, a storage 403, an input/output interface (input/output I/F) 404, and a communication interface (communication I/F) 405. The respective components may be connected to one another via a bus B.

The information processing apparatus 400 can realize a function and a method described in the present embodiment by cooperation of the processor 401, the memory 402, the storage 403, the input/output I/F 404, and the communication I/F 405.

The processor 401 executes a function and/or a method realized by a code or an instruction contained in a program stored in the storage 403. For example, the processor 401 may include a central processing unit (CPU), an MPU (Micro Processing Unit), a GPU (Graphics Processing Unit), a microprocessor, a processor core, a multiprocessor, an ASIC (Application-Specific Integrated Circuit), an FPGA (Field Programmable Gate Array), etc., and realize each process disclosed in each embodiment by a logic circuit (hardware) or a dedicated circuit formed in an integrated circuit (IC (Integrated Circuit) chip and LSI (Large Scale Integration)), etc. Further, these circuits may be realized by one or a plurality of integrated circuits, and a plurality of processes shown in each embodiment may be realized by one integrated circuit. Further, the LSI may be referred to as a VLSI, a super LSI, an ultra LSI, etc. depending on the degree of integration.

The memory 402 may temporarily store a program loaded from the storage 403 and provide a work area for the processor 401. Various data that may be generated while the processor 401 is executing a program may be temporarily stored in the memory 402. The memory 402 may include, for example, a RAM (Random Access Memory), a ROM (Read Only Memory), etc.

The storage 403 may store a program. The storage 403 may include, for example, an HDD (Hard Disk Drive), an SSD (Solid State Drive), a flash memory, etc.

The communication I/F 405 may be mounted as hardware such as a network adapter, communication software, and a combination thereof, and may transmit/receive various data via the network 300. The communication may be executed by wire or wirelessly, and any communication protocol may be used as long as mutual communication can be executed. The communication I/F 405 may execute communication with another information processing apparatus via the network 300. The communication I/F 405 may transmit various data to another information processing apparatus according to an instruction from the processor 401. Further, the communication I/F 405 may receive various data transmitted from another information processing apparatus and may forward the data to the processor 401.

The input/output I/F 404 may include an input device for inputting various operations to the information processing apparatus 400 and an output device for outputting a processing result processed by the information processing apparatus 400. In the input/output I/F 404, the input device and the output device may be integrated with each other, or the input/output I/F 404 may be separated into the input device and the output device.

The input device may be realized by any one of all types of devices capable of receiving an input from a user and forwarding information related to the input to the processor 401, or a combination thereof. The input device may include, for example, a hardware key such as a touch panel, a touch display, or a keyboard, a pointing device such as a mouse, a camera (operation input via a picture), and a microphone (operation input by audio).

The input device can include a sensor unit. The sensor unit may be one or more sensors that detect a face motion indicating a change in facial expression of the user and a body motion indicating a change in a relative position of a body of the user with respect to the sensor unit. The face motion may include movements such as blinking and opening and closing of a mouth. A known sensor unit can be used as the sensor unit. An example of the sensor unit may be a sensor unit including a ToF sensor that measures and detects a flight time (Time of Flight) until light emitted toward the user is reflected on the face of the user and returned, a camera that photographs the face of the user, and an image processing unit that performs image processing on data photographed by the camera. Further, the sensor unit may include an RGB camera that captures visible light and a near-infrared camera that captures near-infrared rays. For the RGB camera and the near-infrared camera, for example, it may be possible to use True Depth of the "IPHONEX®", "LIDER" of the "IPAD PRO®", and other ToF sensors mounted on smartphones. Specifically, this camera may use a dot projector to project tens of thousands of invisible dots (points) on the face of the user, etc. Then, reflected light of a dot pattern may be detected and analyzed to form a depth map of the face and an infrared picture of the face, etc. may be captured, thereby capturing accurate face data. An arithmetic processing unit of the sensor unit may generate various types of information based on the depth map and the infrared picture, and may compare the information with registered reference data to calculate a depth of each point on the face (distance between each point and the near-infrared camera) and a shift of a position other than the depth.

Further, the sensor unit may have a function of tracking (hand-tracking) not only the face of the user but also a hand. The sensor unit may further include a sensor other than the above-mentioned sensors such as an acceleration sensor or a gyro sensor. The sensor unit may have a spatial mapping function of recognizing an object in the real space in which the user exists based on a detection result of the ToF sensor and other known sensors, and mapping the recognized object to a spatial map. Hereinafter, when face motion detection data and body motion detection data may be described without particular distinction, the detection data may simply be referred to as "tracking data". Note that the image processing unit of the sensor unit may be provided with a control unit that can be provided in the information processing system of the invention.

As an operation unit as the input device, it may be possible to use one corresponding to the type of the user terminal. Examples of the operation unit may include a touch panel integrated with a display, operation buttons provided on a housing of a user terminal, a keyboard, a mouse, and a controller operated by a hand of a user. The controller may incorporate various known sensors such as an acceleration sensor and an inertial measurement unit (IMU) such as a gyro. Further, another example of the operation unit may be a tracking device that specifies movement of the hand of the user, movement of eyes, movement of a head, a direction of a line of sight, etc. In this aspect, for example, it may be possible to determine an instruction of the user based on movement of the hand of the user and start or end distribution of a moving image, and to execute various operations such as evaluation of a message or a moving image and a display request of a predetermined object (for example, a gift described later). Note that when the sensor unit additionally has an input interface function such as a hand track function, the operation unit can be omitted.

The output device outputs a processing result processed by the processor 401. The output device may include, for example, a touch panel, a speaker, etc.

Figure 4:
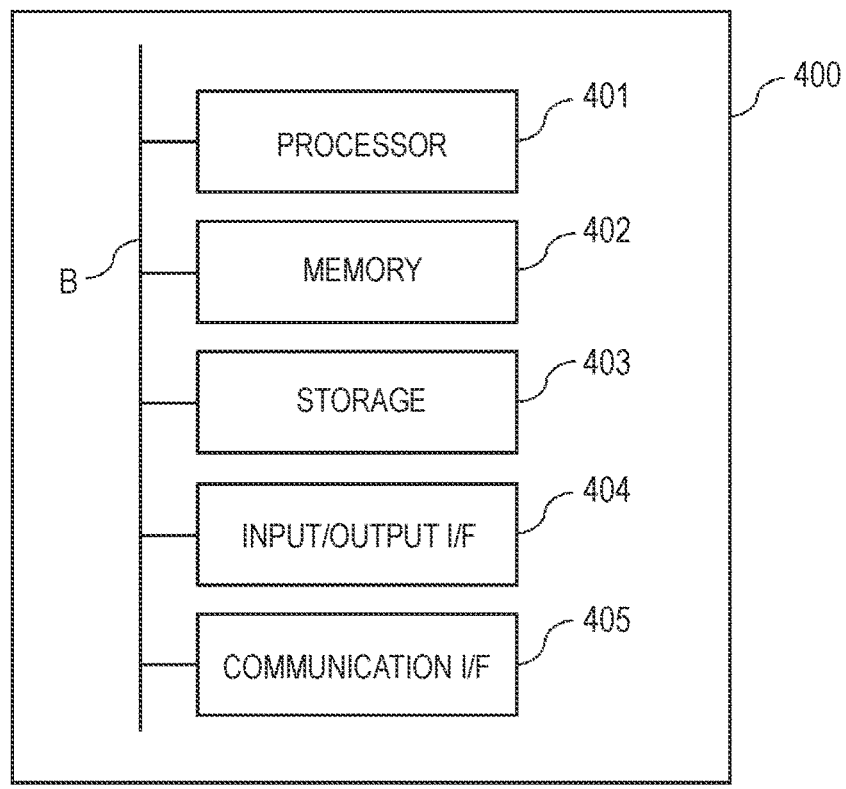
FIG. 4 is a configuration diagram illustrating an exemplary embodiment of a hardware configuration of an information processing apparatus in the disclosure.

Further, the first information processing terminal 100, the second information processing terminal 110, the third information processing terminal 200, and the information processing apparatus 400 in the disclosure may have a hardware configuration similar to that of FIG. 4 unless otherwise specified.

Subsequently, a description will be given of various functions that can be executed on the user terminal starting an application realized by the information processing system in the disclosure, and transition of a displayed screen with reference to the drawings.

Figure 5:
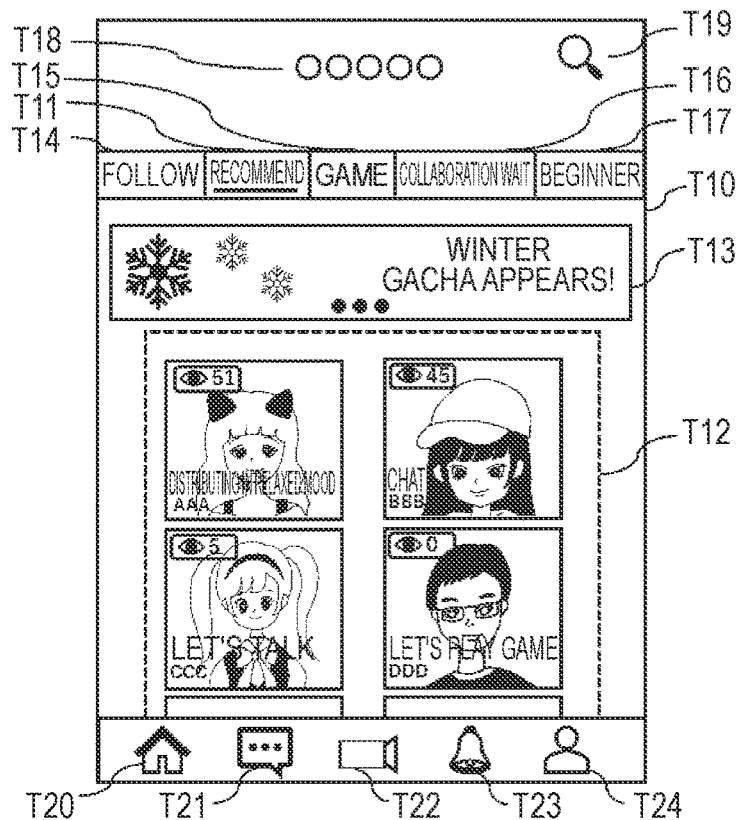
FIG. 5 is a conceptual diagram illustrating an exemplary embodiment of an image of a screen displayed on a user terminal.

FIG. 5 illustrates a top screen T10 displayed on the user terminal when moving image distribution/viewing application may be started.

As illustrated in FIG. 5, the user can select one distribution channel (distribution frame, distribution program, and distribution moving image) from thumbnail pictures of one or more recommended distribution channels T12 listed and displayed as a recommend tab T11 on the top screen T10, thereby viewing a moving image played on the one distribution channel.

Alternatively, the user can access a fixed link of one specific distribution channel, thereby viewing a moving image reproduced on the one specific distribution channel. Such a fixed link can be obtained by a notification from a distributing user who may be following, a notice of a share sent from another user, etc.

In this way, the user viewing the moving image may be the viewing user, and a terminal for viewing the moving image may be a viewing user terminal 2200.

Further, as illustrated in FIG. 5, a display field T13 for a notification of a campaign or an event may be displayed on the top screen T10. The display field T13 for this notification can be switched to a display of another notification by a slide operation.

Then, from the top screen T10, a follow tab 114, a game tab T15 for displaying a game category, a collaboration wait tab T16 for displaying a distribution channel for a collaboration wait, and a beginner tab T17 for displaying a distribution channel for a beginner may be displayed. By selecting these tabs (by switching tabs), transition from the top screen T10 to another screen occurs.

Note that a service name display T18 and a search button T19 in an upper frame of the top screen T10 may be fixedly displayed on a transition destination screen.

Similarly, a home button T20, a message button T21, a distribution preparation button T22, a notice button T23, and a profile button 124 in a lower frame of the top screen T10 may be fixedly displayed on the transition destination screen.

A user selecting the displayed thumbnail picture T12 on the top screen T10, etc. illustrated in FIG. 5 may become a viewing user viewing a moving image, and a user selecting the distribution preparation button T22 may become a distributing user distributing an avatar moving image.

Figure 6:
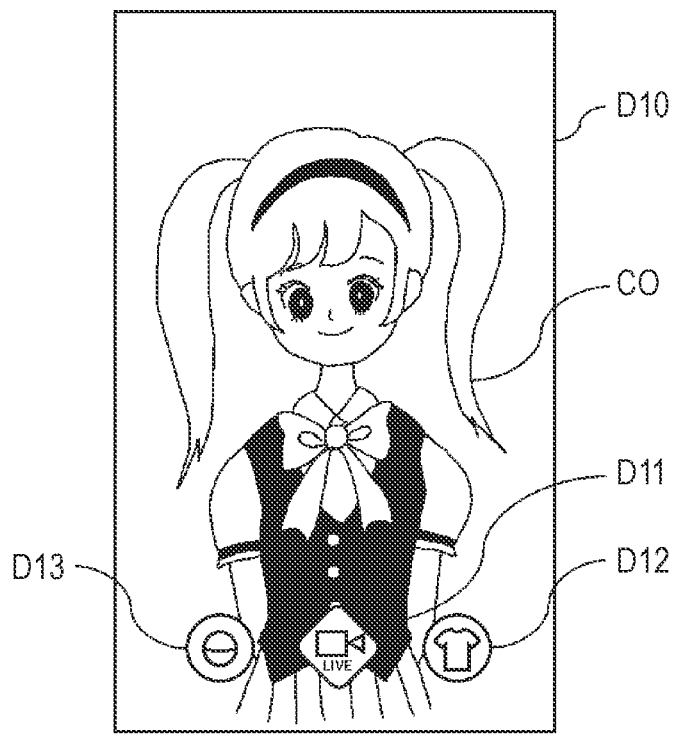
FIG. 6 is a conceptual diagram illustrating an exemplary embodiment of an image of a screen displayed on the user terminal.

As an example, when the distribution preparation button T22 is selected on the top screen T10 illustrated in FIG. 5, transition to an avatar setting screen D10 illustrated in FIG. 6 may occur. Then, when a distribution button D11 is selected on the avatar setting screen D10, transition to a distribution setting screen D20 illustrated in FIG. 7 may occur. Then, when a distribution start button D25 is selected on the distribution setting screen D20, transition to an avatar distribution screen D30 illustrated in FIG. 8 may occur.

Next, a description will be given of details of a process flow taking place prior to the start of moving image distribution.

The one or plurality of computer processors in the disclosure may include a distribution start request reception unit, a distribution setting unit, and a distribution start unit (not illustrated).

The distribution start request reception unit may receive a distribution start request for a first moving image containing an animation of a character object from the distributing user terminal of the distributing user.

Here, the first moving image refers to a moving image containing an animation of a character object. Note that in the specification, the character object may be referred to as "avatar".

Then, the distribution start request can be transmitted from the user terminal to the information processing apparatus 2400 by selecting the distribution button disposed on the avatar setting screen, etc. transitioned from the top screen displayed on the user terminal (later to become the distributing user terminal 2100) starting a dedicated application (moving image distribution/viewing application) for accessing the moving image distribution platform.

FIG. 6 illustrates an example of the avatar setting screen D10. A character object CO, a distribution button D11, a clothes change button D12, a gacha button D13, etc. may be displayed on the avatar setting screen D10.

When the clothes change button D12 is selected by the user, a closet screen for selecting various avatar parts such as eyes, nose, mouth, hair, accessory, clothes, and background of the character object CO may be expanded.

When the gacha button D13 is selected by the user, a lottery screen for obtaining the avatar parts may be expanded.

Then, when the distribution button D11 is selected by the user, a distribution start request may be transmitted to the information processing apparatus 2400.

The distribution setting unit may set distribution setting of the first moving image based on designation from the distributing user terminal 2100 in response to the distribution start request for the first moving image received by the distribution start request reception unit.

Figure 7:
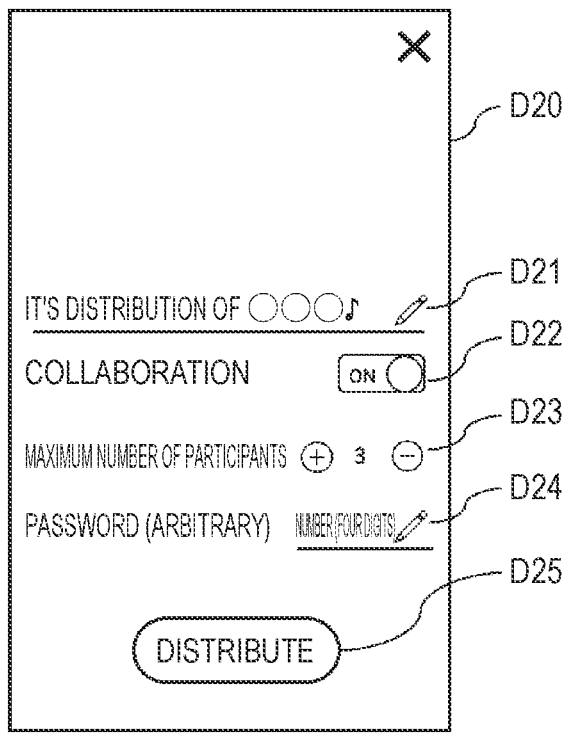
FIG. 7 is a conceptual diagram illustrating an exemplary embodiment of an image of a screen displayed on the user terminal.

As an example, when the distribution button D11 is selected, the screen displayed on the distributing user terminal 2100 transitions from the avatar setting screen D10 illustrated in FIG. 6 to the distribution setting screen D20 illustrated in FIG. 7.

The distribution setting may include at least one of: a setting related to a title of the first moving image, a setting related to whether or not another user can appear in the first moving image, a setting related to the number of people who can appear in the first moving image, and a setting related to a password.

These distribution settings can be set in a title setting field D21, a collaboration availability setting field D22, a number-of-people setting field D23, and a password setting field D24 in FIG. 7, respectively.

The title of the first moving image can be freely determined by the distributing user within a range of the number of characters up to a permissible upper limit. Note that when there may be no input by the distributing user, a preset title including a name of the distributing user or the character object, such as "It's distribution of ○○○♪)", may be automatically determined.

In an exemplary embodiment, whether or not another user can appear in the first moving image can be freely determined by the distributing user. When the distributing user determines that another user can appear in the first moving image, another user can apply for appearance to the distributing user, and when the distributing user determines that another user cannot appear in the first moving image, another user cannot apply for appearance to the distributing user. A state in which another user appears in the moving image of the distributing user may be referred to as "collaboration" in the specification. Details of the collaboration will be described later.

In an exemplary embodiment, the number of people who can appear in the first moving image can be set only when another user can appear in the first moving image, and can be freely determined by the distributing user in a range of the number of people up to the permissible upper limit.

In an exemplary embodiment, the password can be arbitrarily set only when another user can appear in the first moving image, and the distributing user can freely determine the number of the designated number of digits. When another user applies for appearance in the first moving image, input of such a password may be required.

The distribution start unit may distribute information relates to the first moving image to the viewing user terminal 2200 of the viewing user based on a condition set by the distribution setting unit.

The distribution start instruction may be transmitted by selecting the distribution start button D25 illustrated in FIG. 7.

As an example, the distribution start unit may distribute information related to a moving image (first moving image) including an animation of a character object of the distributing user to the viewing user terminal 2200 of the viewing user (distributing an avatar).

The information related to the first moving image may contain, for example, motion information indicating an operation of the character object, audio information of the distributing user, and gift object information indicating a gift sent from another viewing user. Further, the gift object information may include at least gift object identification information that specifies a type of gift object and position information that indicates a position where the gift object may be displayed.

Then, in an exemplary embodiment, the distribution start unit can live-distribute the moving image via the moving image distribution platform.

Figure 8:
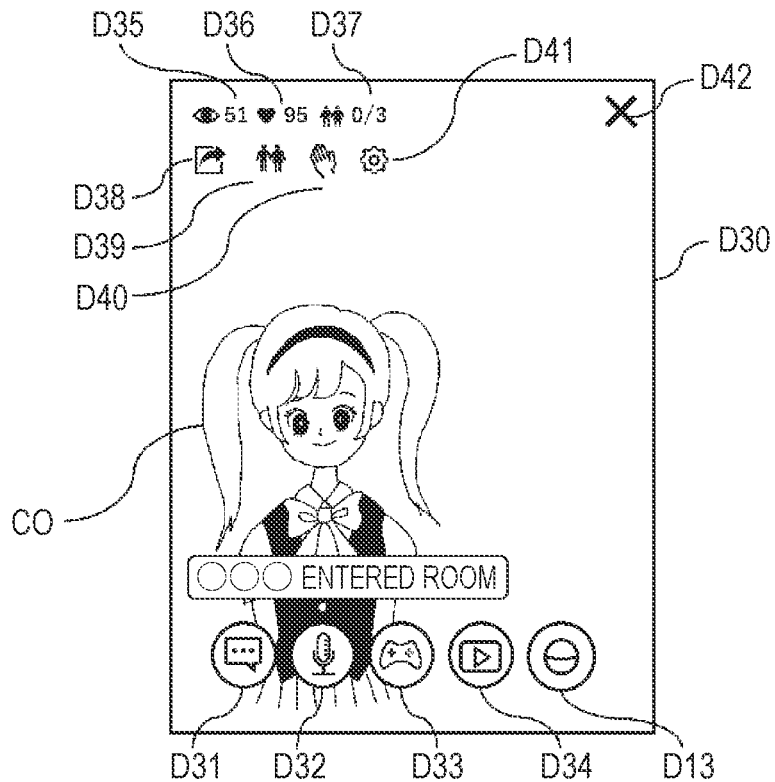
FIG. 8 is a conceptual diagram illustrating an exemplary embodiment of an image of a screen displayed on the user terminal.

FIG. 8 illustrates the avatar distribution screen D30 displayed on the distributing user terminal 2100.

In addition to displaying the character object CO, a comment input button D31 for the distributing user to input a comment, an audio switching button D32 for switching audio ON/OF, a play start button D33 for playing a game described later, an external service cooperation button D34 for viewing a moving image provided by an external service, and the gacha button D13 for obtaining an avatar part can be displayed on the avatar distribution screen D30.

In addition, in an upper part of the avatar distribution screen D30, it may be possible to display a cumulative-number-of-viewers display D35, a cumulative-number-of-likes display D36, a number-of-people-of-collaboration display D37, a share button D38 to an external SNS, a guest detail button D39, an invitation button D40, and a setting button D41. In addition, an end button D42 for ending distribution may be displayed.

Even though detailed description of these displays and buttons may be omitted, it may be possible to change distribution settings set on the distribution setting screen D20 by selecting the setting button D41.

Note that FIG. 8 illustrates an example of starting distribution by allowing another user to appear in the first moving image and setting the number of people who can appear in the first moving image to three on the distribution setting screen D20. Therefore, the character object CO may be displayed in a state of being closer to the lower left. Up to three character objects of other users can appear in a vacant space.

A description of screen transition when avatar distribution of the invention in the disclosure may be performed has been given above.

Next, a description will be given of an exemplary embodiment of a screen transition process when the distributing user plays a game during distribution.

The one or plurality of computer processors in the disclosure may include a game request reception unit, a game moving image distribution unit, and a game display processing unit (not illustrated).

The distributing user can request that playing of the game be started by selecting the play start button D33 during avatar distribution illustrated in FIG. 8.

Note that a game displayed by selecting the play start button D33 may be a dedicated game implemented in an application realized by the information processing system in the disclosure, and may be different from a general-purpose game provided by an external service. Therefore, the game distribution in the disclosure may be distinguished from distribution of a general-purpose game play moving image provided by an external service together with an actual situation of the distributing user.

Alternatively, the play start request can be transmitted from the distributing user terminal to the information processing apparatus 400 by selecting the play start button disposed on a predetermined screen displayed on the distributing user terminal.

Figure 9:
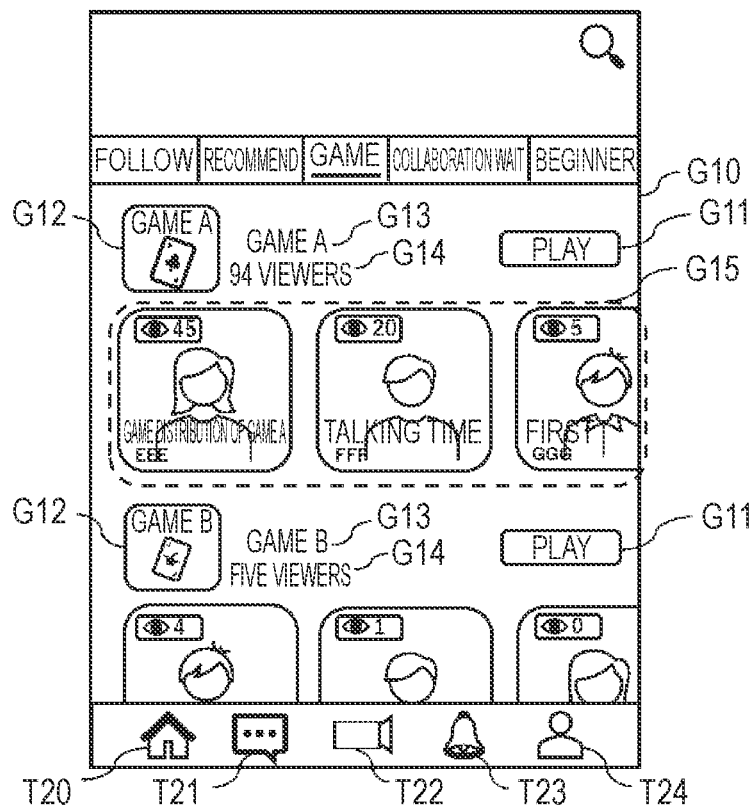
FIG. 9 is a conceptual diagram illustrating an exemplary embodiment of an image of a screen displayed on the user terminal.

FIG. 9 illustrates an example of the screen G10 in which a play start button G11 may be disposed as the predetermined screen. The screen G10 illustrated in FIG. 9 may be a screen transitioning from the top screen T10 (FIG. 5) displayed on the user terminal starting the application realized by the information processing system in the disclosure by selecting the game tab T15.

At least, the play start button G11 allowing transmission of a play start request of a predetermined game may be displayed on the screen G10.

Then, when the game request reception unit receives the play start request of the predetermined game, the game moving image distribution unit may distribute information related to a second moving image to the viewing user terminal.

Here, the second moving image may be a play moving image of the predetermined game. In the specification, distribution performed so that such a moving image may be displayed on the screen of the viewing user terminal 2200 may be referred to as "game distribution".

Further, the user can transmit a second moving image distribution start request to the information processing apparatus 400 as the distributing user by selecting a play start object disposed on a game list screen and a game detail screen after the application realized by the invention of the disclosure may be started.

The game list screen or the game detail screen may be a first screen to be described in detail next.

That is, the game display processing unit may perform display processing of the first screen including a distribution start object capable of transmitting a distribution start request, a play start object capable of transmitting a play start request of a predetermined game, and a thumbnail picture of a moving image distributing a play moving image of a predetermined game.

The screen G10 illustrated in FIG. 9 may correspond to the game list screen in the first screen. The first screen, which may be the game list screen, may be a screen transitioned from the top screen T10 by selecting the game tab T15.

The first screen may include the distribution preparation button T22 as a distribution start object, the play start button G11 as a play start object, and a thumbnail picture indicating a distribution channel of a moving image.

Each of a play start button G11, a game icon G12, a game name G13, a total number of viewers of a distribution channel of the game G14, and a distribution list G15 including a thumbnail picture of a distribution channel distributing the game may be displayed on the first screen for each of a plurality of playable games.

Note that the order of thumbnail pictures displayed in the distribution list G15 displayed here may be different depending on the viewing user. As an example, the order may be arranged in the order of priority of the descending order of the number of views by the viewing user followed by the viewing user, the descending order of cumulative number of viewers, and the ascending order of the distribution start. Note that it may be assumed that a display range of the thumbnail picture of the distribution list G15 can be changed by horizontal scrolling.

In addition, the game displayed on this game list screen reads the top 10 titles with the following priorities. As an example, the priority may be determined by the descending order of the date of the last play by the viewing user within 30 days within 48 hours from the game distribution start date and time, the descending order of the priority of a period ID, and the descending order of the period ID.

This distribution list G15 may be updated when returning from a screen of another tab and when performing a refresh operation (Pull-to-Refresh).

Figure 10:
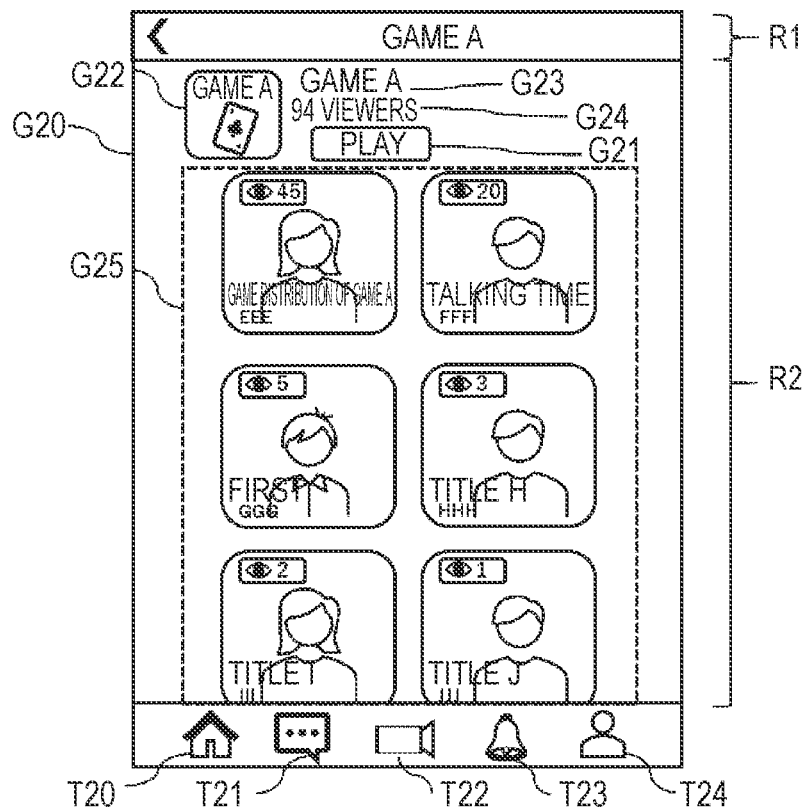
FIG. 10 is a conceptual diagram illustrating an exemplary embodiment of an image of a screen displayed on the user terminal.

Further, FIG. 10 may correspond to the game detail screen in the first screen. The first screen, which may be the game details screen, may be the screen G20 transitioned by selecting the game icon G12 or the game name G13 displayed on the game list screen illustrated in FIG. 9.

The first screen may include the distribution preparation button T22 which may be a distribution start object, a play start button G21 which may be a play start object, and a thumbnail picture indicating a distribution channel of a moving image.

Further, each of a game icon G22, a game name G23, a total number of viewers G24 of a distribution channel of the game, and a distribution list G25 including a thumbnail picture of a distribution channel distributing the game may be displayed on the first screen.

Note that the order of thumbnail pictures displayed in the distribution list G25 displayed here may be different depending on the viewing user. As an example, the order may be arranged in the order of priority of the descending order of the number of views by the viewing user followed by the viewing user, the descending order of cumulative number of viewers, and the ascending order of the distribution start. Note that it may be assumed that a display range of the thumbnail picture of the distribution list G25 can be changed by vertical scrolling.

This distribution list G25 may be updated when returning from a screen of another tab and when performing a refresh operation (Pull-to-Refresh).

As described above, the user selecting the distribution start object or the play start object may become the distributing user making the distribution start request or the play start request.

In addition, the user selecting the thumbnail picture may become the viewing user viewing the second moving image.

Further, the first screen may include a first region where scrolling operation is not allowed and a second region where scrolling operation is allowed.

The first screen mentioned here may be the first screen illustrated in FIG. 10. The first screen may include a first region R1 and a second region R2. Specifically, the game title may be displayed in the first region R1, and the play start button G21, the game icon G22, the game name G23, the number of viewers G24, and the distribution list G25 may be displayed in the second region R2.

Further, the first region R1 may be a part, in which scroll operation cannot be performed, fixed and displayed on the display screen, and the second region R2 may be a part in which scroll operation can be performed by the user. By scrolling the second region R2, the user can check a thumbnail picture hidden outside the screen.

Incidentally, since scrolling of the second region may hide the play start button G21 outside the screen, the play start object (play start button G21) can be displayed in the first region R1 according to a display state of the play start object (play start button G21) displayed in the second region R2.

Figure 11:
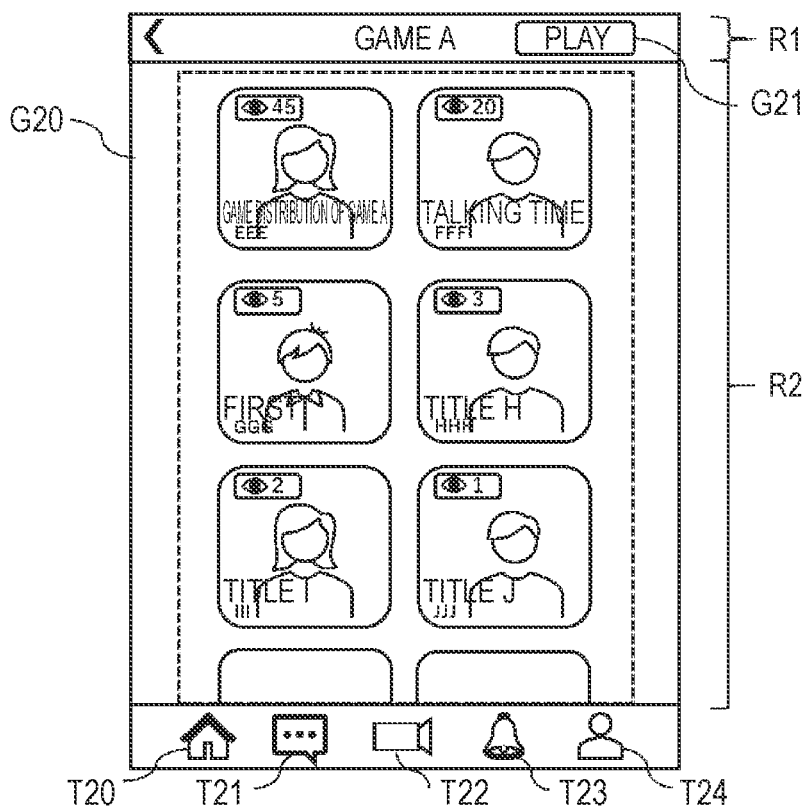
FIG. 11 is a conceptual diagram illustrating an exemplary embodiment of an image of a screen displayed on the user terminal.

As an example, the play start button G21 may be displayed in the second region R2 in FIG. 10 and displayed in the first region R1 in FIG. 11. That is, when a part of or the entire start button G21 is not displayed in the second region R2, the play start button G21 may appear in the first region.

Further, the game display processing unit may display the play start object in the first region R1 stepwise according to the display state of the play start object displayed in the second region R2.

Such an expression can be realized by changing the transparency of the play start object according to the scroll amount of the second region R2.

As an example, a scroll amount of between 0 to 50 pixels may correspond to the transparency of the button from 0.0 (completely transparent) to 1.0 (completely opaque). Then, in an initial display state, the object may be completely transparent and thus cannot be seen, and in response to scrolling 50 pixels or more, the object may be completely displayed. During this time (when scrolling between 0 to 50 pixels), it may be preferable to linearly change the transparency of the object. Note that the unit of the scroll amount may be a logical pixel, which may be different from an actual pixel of the display.

Further, it may be assumed that the game request reception unit can receive a play end request of a predetermined game from the distributing user terminal after the game moving image distribution unit distributes the information related to the second moving image.

The play end request can be transmitted by selecting the end button disposed on the game screen.

Then, when the game request reception unit receives the play end request of the predetermined game, the moving image distribution unit can end the distribution of the information related to the second moving image and distribute the information related to the first moving image.

That is, rather than a part of the information of the first moving image, all the information of the first moving image may be distributed here.

Then, when the moving image distribution unit ends distribution of the information related to the second moving image and distributes the information related to the first moving image, it may be assumed that the first moving image may be displayed on the viewing user terminal 2200.

Next, a description will be given of an exemplary embodiment of a process flow for starting viewing of the moving image.

The one or plurality of processors in the disclosure may further include a viewing reception unit (not illustrated).

The viewing reception unit may receive a moving image viewing request from the user.

In response to the viewing request, the moving image distribution unit may distribute information related to video and audio as moving image information to the information processing terminal of the user.

Figure 12:
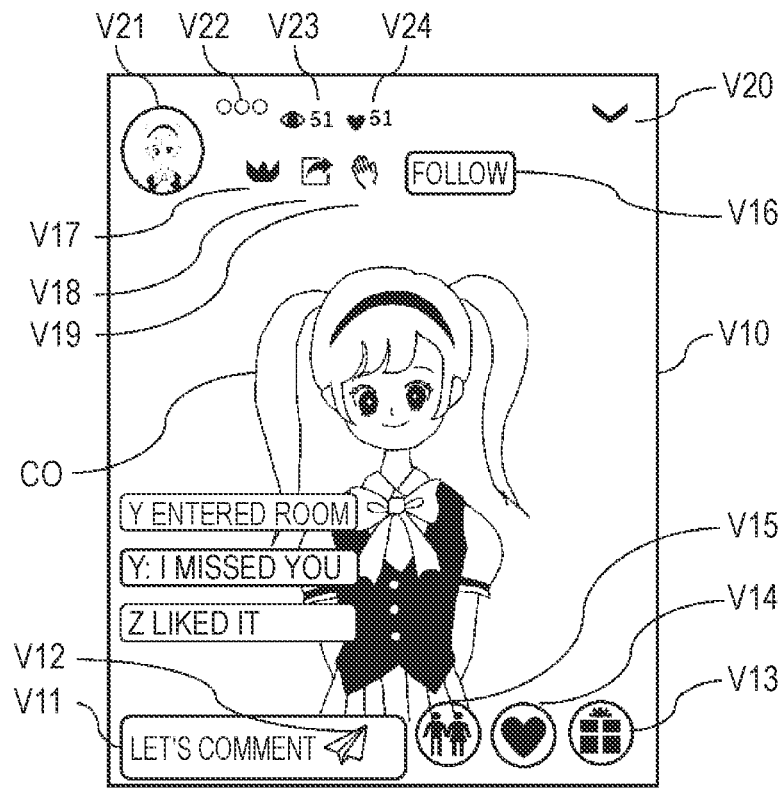
FIG. 12 is a conceptual diagram illustrating an exemplary embodiment of an image of a screen displayed on the user terminal.

FIG. 12 may provide an example illustrating a viewing screen V10 of an avatar moving image displayed on the viewing user terminal 2200.

In the depicted exemplary embodiment, the viewing user may be able to post a comment by inputting text in a comment posting field V11 and pressing a send button V12.

Further, by pressing a gift button V13, a gift list (screen V30 of FIG. 13) may be displayed to the viewing user, and a display request for a gift designated by selection can be transmitted.

At this time, the one or plurality of processors in the disclosure may include a determination unit (not illustrated). The determination unit may determine whether or not there is a gift display request from the viewing user terminal 2200.

The display request can include gift object information. The gift object information may include at least gift object identification information that specifies a type of gift object and position information that indicates a position where the gift object is displayed.

Figure 13:
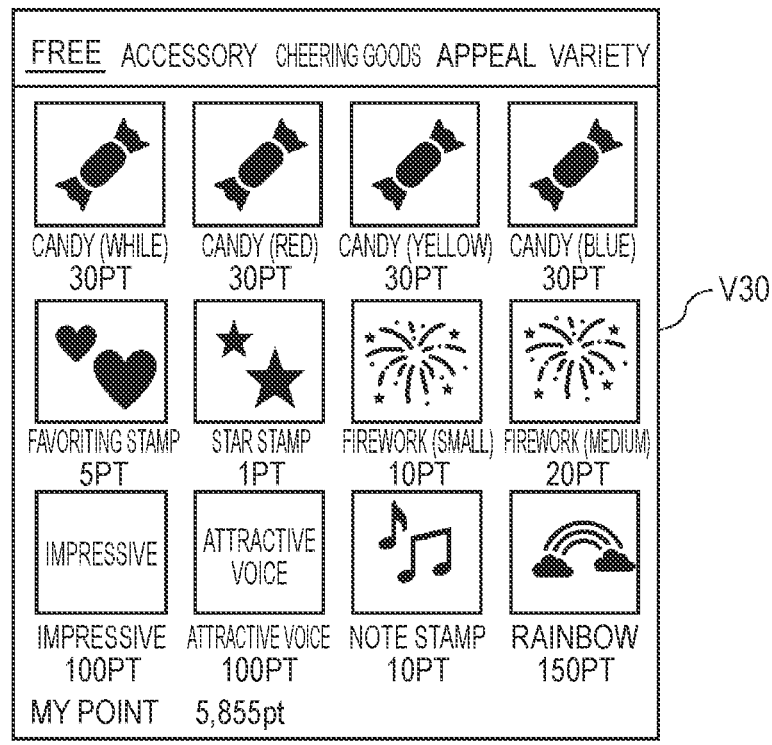
FIG. 13 is a conceptual diagram illustrating an exemplary embodiment of an image of a screen displayed on the user terminal.

Further, as illustrated in FIG. 13, gifts can be displayed separately for each category (free (paid) gift, accessory, cheering goods, appeal, variety, etc.).

Here, the paid gift may be a gift that can be purchased by consuming my coins purchased by the viewing user, and the free gift may be a gift that can be obtained by consuming or without consuming my points obtained for free by the viewing user.

Note that the term "gift" used in the application may, in an exemplary embodiment, cover a concept similar to what is meant by the term "token". Therefore, in an exemplary embodiment, it may be possible to replace the term "gift" with the term "token" to understand the technology described in the application.

In addition, the viewing user can post an evaluation showing favor by pressing a like button V14. Note that in addition to/instead of the like button V14, it may be possible to display a button for posting a negative evaluation or other emotions.

In addition, when the distributing user may set a distribution setting to allow another user to appear, an application for appearance in the moving image can be sent by selecting a collaboration application button V15.

Further, a follow button V16 for the viewing user to follow the distributing user may be displayed on the screen of the moving image distributed by the distributing user not followed by the viewing user. This follow button functions as an unfollow button on the screen of the moving image distributed by the distributing user followed by the viewing user.

Note that this "follow" may be performed from the viewing user to the viewing user, from the distributing user to the viewing user, and from the distributing user to the distributing user. However, it may be assumed that followers may be managed as associations in only one direction, and reverse associations may be managed separately as followers.

Further, a cheering ranking display button V17, a share button V18, and an invitation button V19 may be displayed on the viewing screen V10.

A cheering ranking displays a ranking of the viewing user cheering for the distributing user, and the ranking can be calculated according to the amount of the gift (points/coins), etc.

In addition, with regard to moving image sharing, the viewing user can check a list of SNSs (social networking services) that can be shared by pressing the share button V18, and transmit a fixed link to a designated location of an SNS designated by selection.

Similarly to the first object in the disclosure, the invitation button V19 may be used to call a second user to a moving image being viewed, and can display a list screen for calling mutual follow by selection.

Figure 14:
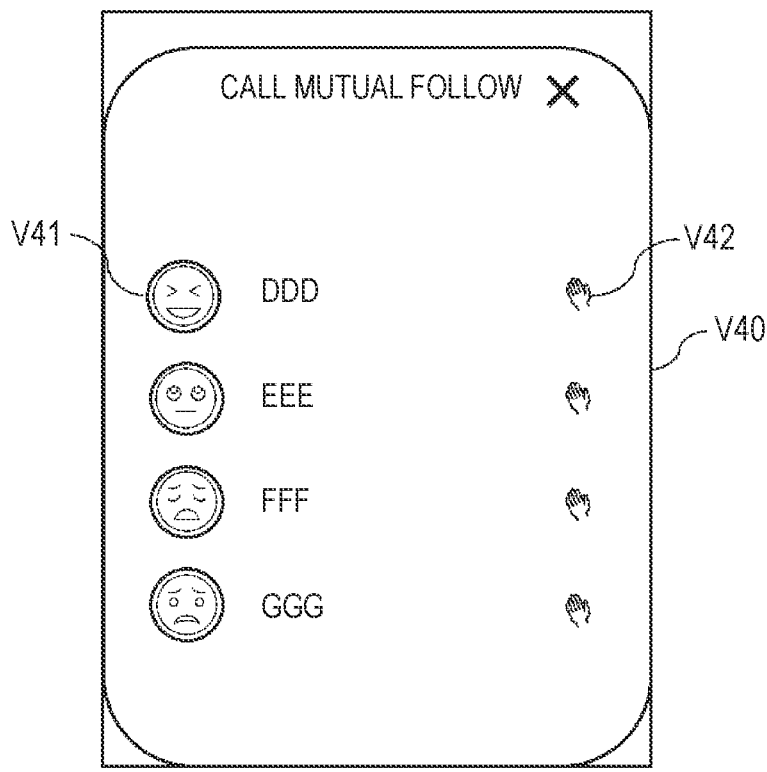
FIG. 14 is a conceptual diagram illustrating an exemplary embodiment of an image of a screen displayed on the user terminal.

FIG. 14 illustrates an example of a list screen V40 for calling mutual follow. On the list screen V40, it may be possible to display a picture indicating a profile of one or more second users having a specific relationship with the first user and/or a name V41, and a first object V42. By selecting the first object V42, a call notice may be transmitted to the second user.

In addition, by pressing the collaboration application button V15, it may be possible to request collaboration distribution from the distributing user. Collaboration distribution means that the character object of the viewing user may be allowed to appear in the distribution moving image of the distributing user.

In an upper part of the viewing screen V10, it may be possible to display a distributing user icon V21, a distributing user name (character object name) V22, a display of the cumulative number of viewers V23, and a display of the cumulative number of likes V24.

Further, when a viewing end button V20 may be selected, a screen for ending viewing may be expanded, and a viewing end request can be transmitted.

The screen for ending such viewing will be described in detail. Such a screen may be referred to as "small window audio distribution", and may be for viewing a moving image in a manner of reproducing only audio while displaying video.

Selection of the viewing end button V20 may be received by the viewing reception unit as a viewing end request for a moving image.

At this time, the moving image distribution unit may end distribution of information related to video in response to the viewing end request, and does not end distribution of information related to audio.

Further, the user terminal may be characterized in that when information related to video and audio is distributed, the video may be displayed on a main screen on the user terminal, and when only information related to audio is distributed, video may be not displayed and a sub-screen indicating that a moving image is being viewed may be displayed on the user terminal.

Figure 15:
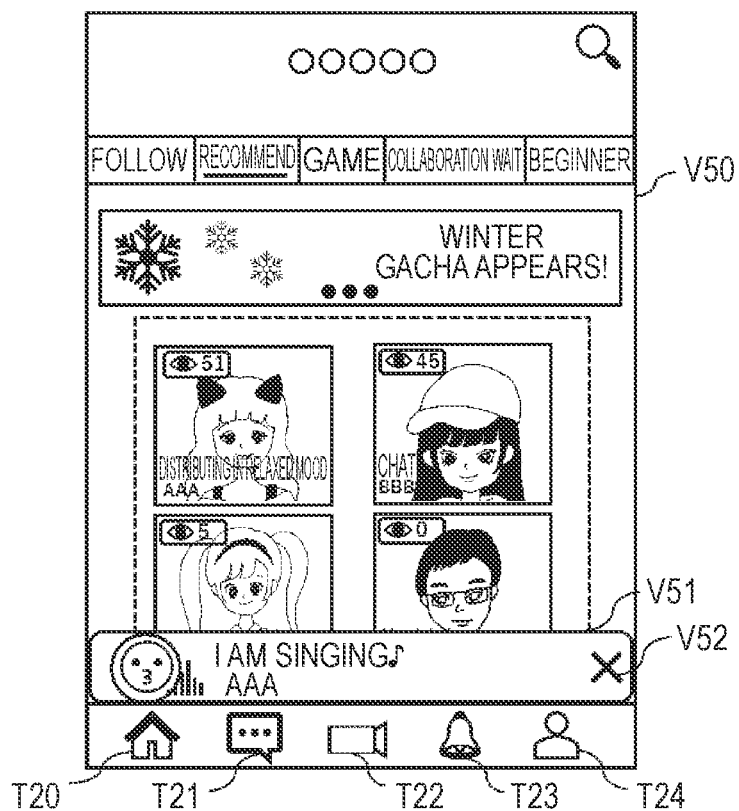
FIG. 15 is a conceptual diagram illustrating an exemplary embodiment of an image of a screen displayed on the user terminal.

FIG. 15 illustrates an image of a screen V50 on which the sub-screen V51 may be displayed.

When this sub-screen V51 is displayed, the main screen displayed on the back may transition to a screen before viewing the moving image. For example, when moving from a recommend tab to a viewing frame, the display returns to the recommend tab, and when moving from a follow tab to the viewing frame, transition to the follow tab may occur.

When this sub-screen V51 is displayed, the operation on the main screen may become possible, and transition to another screen may become possible.

On the sub-screen V51, a profile picture, a name, a title, and an audio icon that allows visual identification of flowing audio may be displayed.

Then, by selecting an end icon V52 displayed on the sub-screen V51, viewing can be completely ended.

Note that with regard to the end of the video display, information may be transmitted from the server apparatus and not be displayed on the terminal side, or information transmission from the server apparatus may be suspended.

According to such a configuration, it may become possible to search for another distribution and enjoy chatting with another user while listening only to audio.

Next, a description will be given of "collaboration" in which another user may appear in a moving image of the distributing user.

As described above, the viewing user can transmit a request for participation in the moving image via a screen for confirming a collaboration distribution participation request displayed by pressing the collaboration application button V15 illustrated in FIG. 12.

A collaboration avatar display unit (not illustrated) may display a character object generated based on movement of the viewing user making the participation request in a moving image in response to the participation request received by a reception unit.

Figure 16:
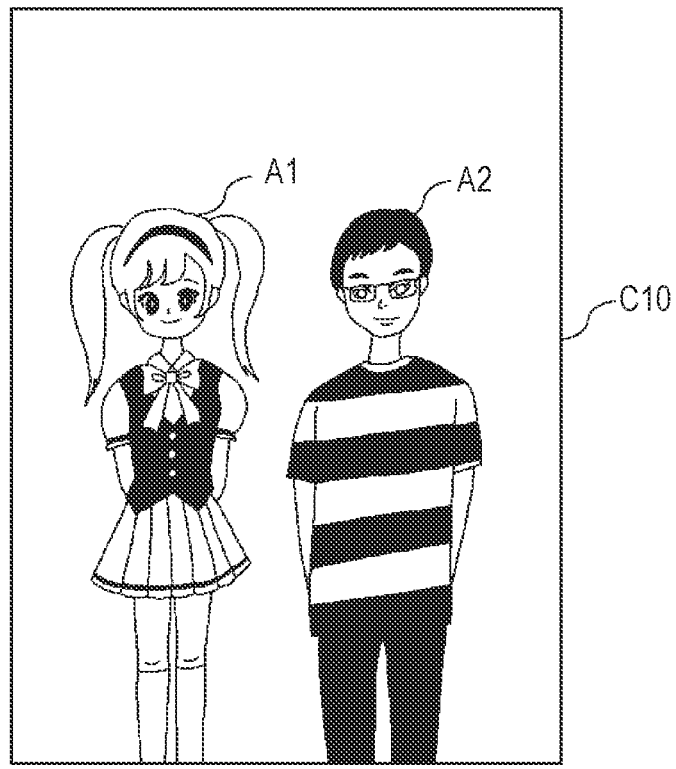
FIG. 16 is a conceptual diagram illustrating an exemplary embodiment of an image of a screen displayed on the user terminal.

FIG. 16 illustrates, as an example, viewing or a distribution screen C10 when a second avatar A2, which may be a character object of a guest user, participates in a moving image in which a first avatar A1, which may be a character object of a host user, may be displayed. Note that in FIG. 16, display of an object other than the avatar may be omitted.

Figure 17:
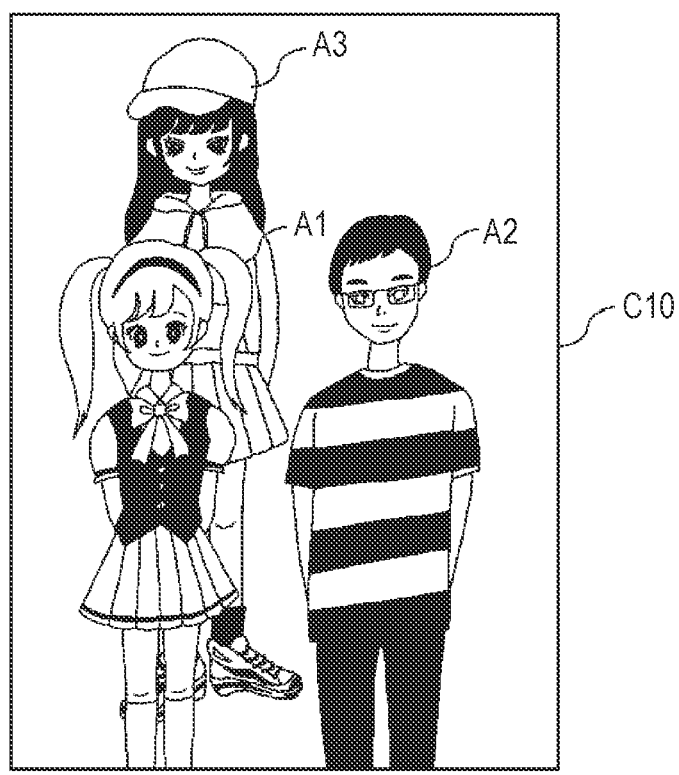
FIG. 17 is a conceptual diagram illustrating an exemplary embodiment of an image of a screen displayed on the user terminal.

Further, as illustrated in FIG. 17, a third avatar A3, which may be a character object generated based on movement of another viewing user, may participate in the moving image. Note that even though the third avatar A3 may be disposed behind the first avatar A1 and the second avatar A2 in FIG. 17, three people may be disposed so as to be arranged in a horizontal row. Further, an arrangement position of an avatar may be designated by the distributing user.

Figure 18:
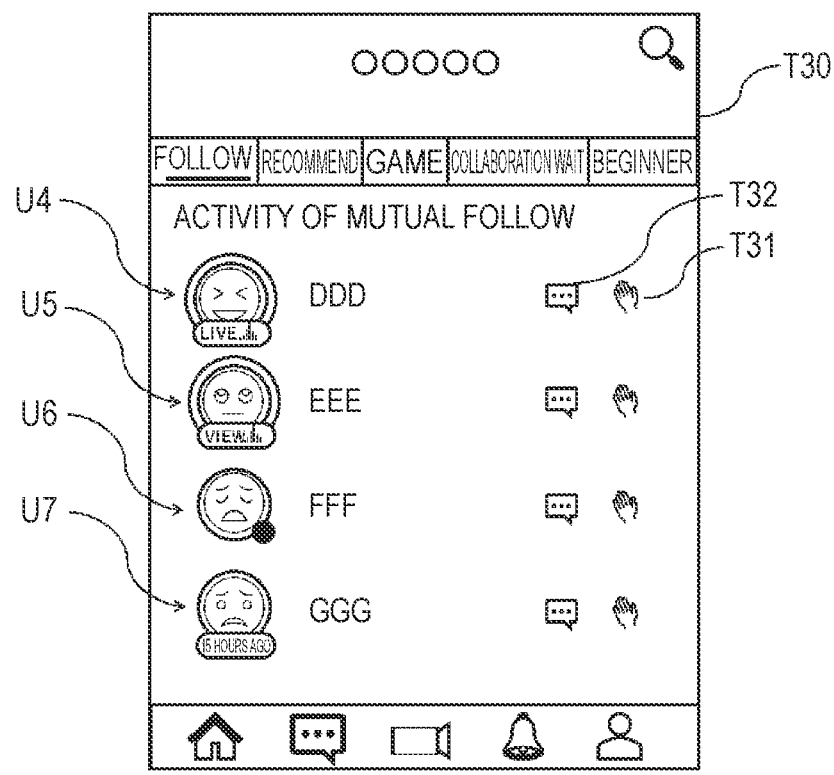
FIG. 18 is a conceptual diagram illustrating an exemplary embodiment of an image of a screen displayed on the user terminal.

FIG. 18 illustrates a list screen T30 of users having a mutual follow relationship, which may be displayed by selecting the follow tab on the top screen illustrated in FIG. 5. Mutual follow may be a relationship in which each other may be a follower of the other.

On this list screen T30, profile pictures and names of users having the mutual follow relationship may be displayed.

As illustrated in FIG. 18, it may be assumed that a first object T31 may be displayed on the list screen T30 for each second user. Further, a chat object T32 may be displayed together with the first object T21. By selecting this chat object, it may be possible to transition to an individual chat screen with a second user.

The first object may transmit a predetermined notice to the second information processing terminal 110 associated with the first object T31.

As an example, the predetermined notice can be a call notice indicating that the first user related to the first information processing terminal may be calling the second user. As an example, it may be assumed that the call notice may display characters "BBB (user name) may be calling", a profile picture of the second user, and a second object.

Figure 19:
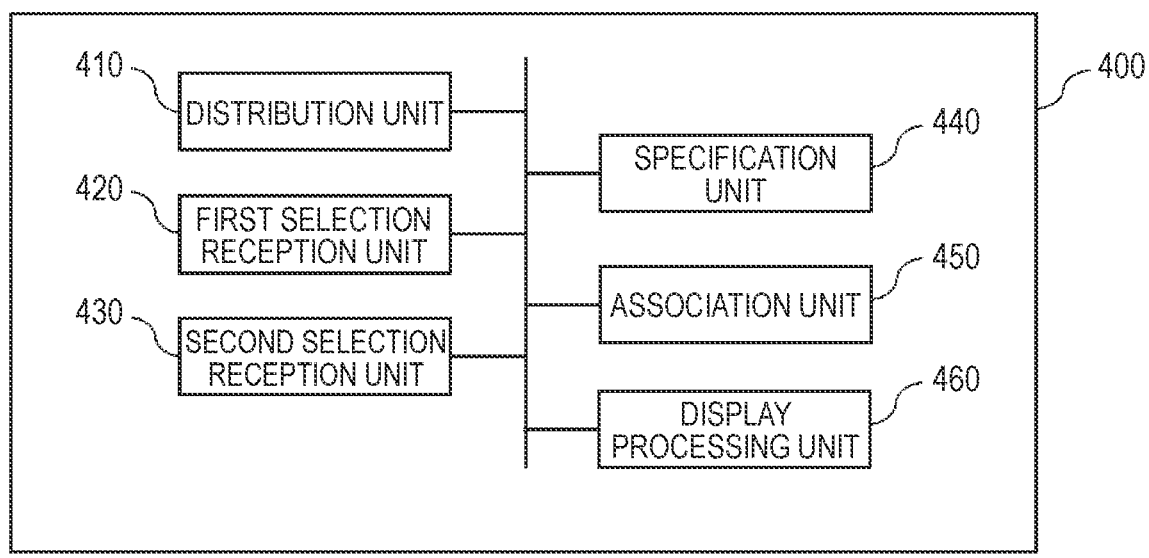
FIG. 19 is a configuration diagram illustrating an exemplary embodiment of a functional configuration of the information processing apparatus in the disclosure.

Further, as illustrated in FIG. 19, the one or plurality of computer processors may include a distribution unit 410, a first selection reception unit 420, a second selection reception unit 430, a specification unit 440, an association unit 450, and a display processing unit 460.

Note that in the present embodiment, a description may be given on the assumption that the one or plurality of computer processors may be included in the information processing apparatus 400. However, the one or plurality of computer processors may be shared by the information processing apparatus 400, the first information processing terminal 100, the second information processing terminal 110, and the third information processing terminal 200.

The distribution unit 410 may distribute a moving image containing a plurality of character objects associated with each of a plurality of performing users. According to an exemplary embodiment, there may be one-to-one correspondence between the plurality of character objects and the plurality of performing users, so that each object in the plurality of character objects is uniquely associated with one and only one user in the plurality of users.

The plurality of performing users may include a host user distributing a moving image and one or more guest users participating in the moving image. Such a moving image can be realized by the collaboration function. However, the invention may not be limited thereto, and the moving image can be realized when there is a plurality of performing users in the studio distribution. In the present embodiment, a description may be given on the assumption that the moving image may be realized by the collaboration function.

Figure 20:
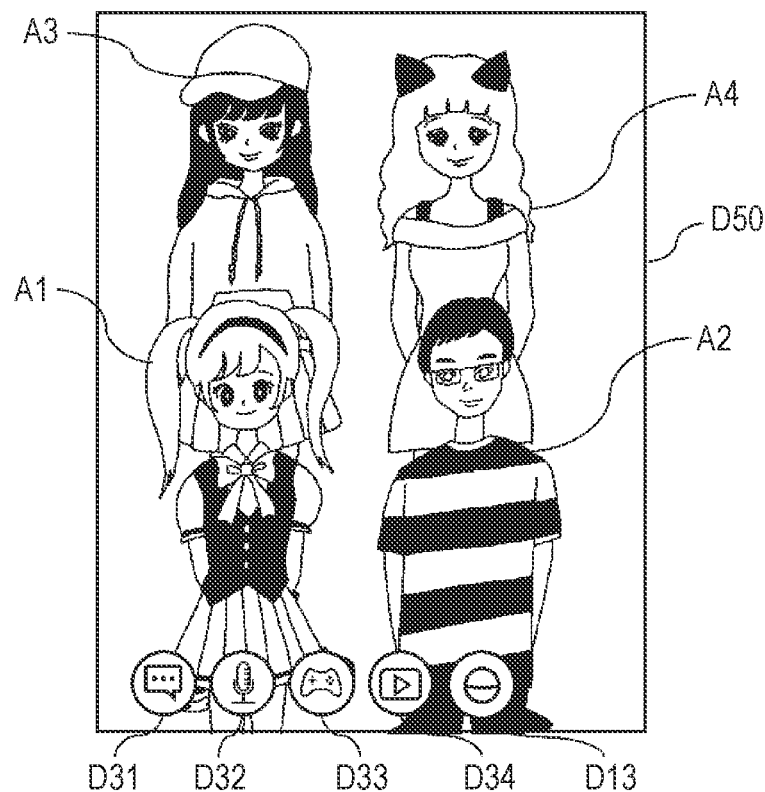
FIG. 20 is a conceptual diagram illustrating an exemplary embodiment of an image of a screen displayed on the user terminal.

FIG. 20 is a diagram illustrating an image of a distribution screen D50, in which a plurality of character objects A1 to A4 associated with each of the four performing users may be displayed, distributed by the distribution unit 410. Note that even though omitted in FIG. 20, the display of the number of viewers illustrated in FIG. 8 can be continued.

Note that in FIG. 20, the character object A1 may be an object associated with the host user, and the character objects A2 to A4 may be objects associated with the guest users.

Arrangement locations of the character objects A1 to A4 may be freely determined by the host user, or the arrangement locations may be determined in the order in which the guest users enter the moving image of the host user.

Note that even though FIG. 20 illustrates an example in which two character objects may be disposed and displayed in a front row and two character objects may be disposed and displayed in a back row, all the character objects may be displayed side by side. In addition, assuming that the arrangement locations may be determined in the order of entry of the guest users, when there may be a guest user leaving the room, an arrangement location of a character object of another guest user may be changed to fill a location previously occupied by a character object of the guest user leaving the room.

Figure 21:
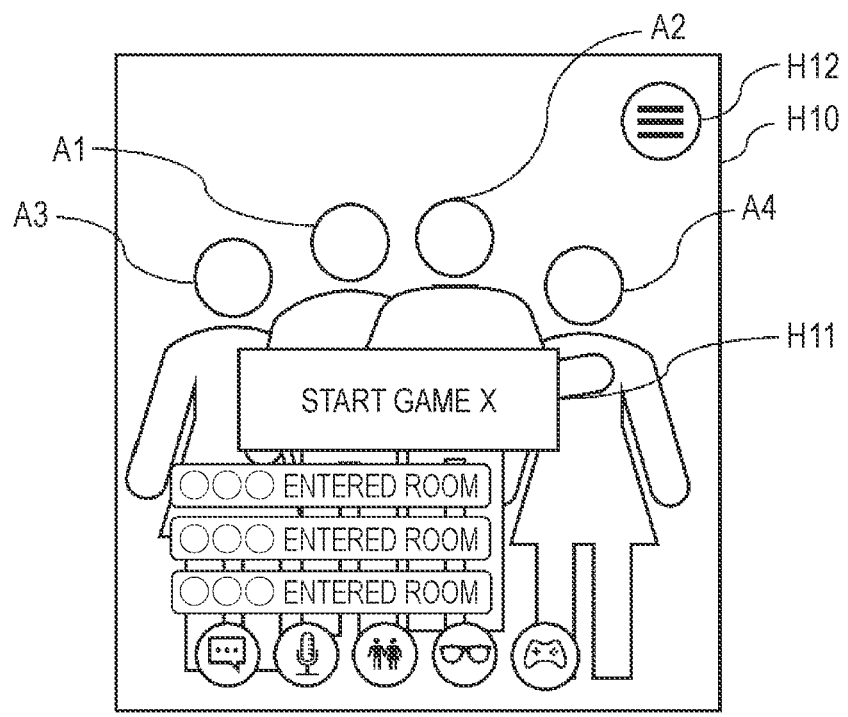
FIG. 21 is a conceptual diagram illustrating an exemplary embodiment of an image of a screen displayed on the user terminal.

Further, FIG. 21 may be an example of a game start screen H10 displayed on a screen of a user terminal of the host user when a predetermined game started by selecting the game start button D33 on a distribution screen D50 may be started. It may be assumed that a start object H11 for starting the game may be displayed on the start screen H10. Further, when the number of participants is insufficient, the screen may transition to a screen H20 in which an object H21 for inviting a guest user illustrated in FIG. 22 may be displayed.

Figure 22:
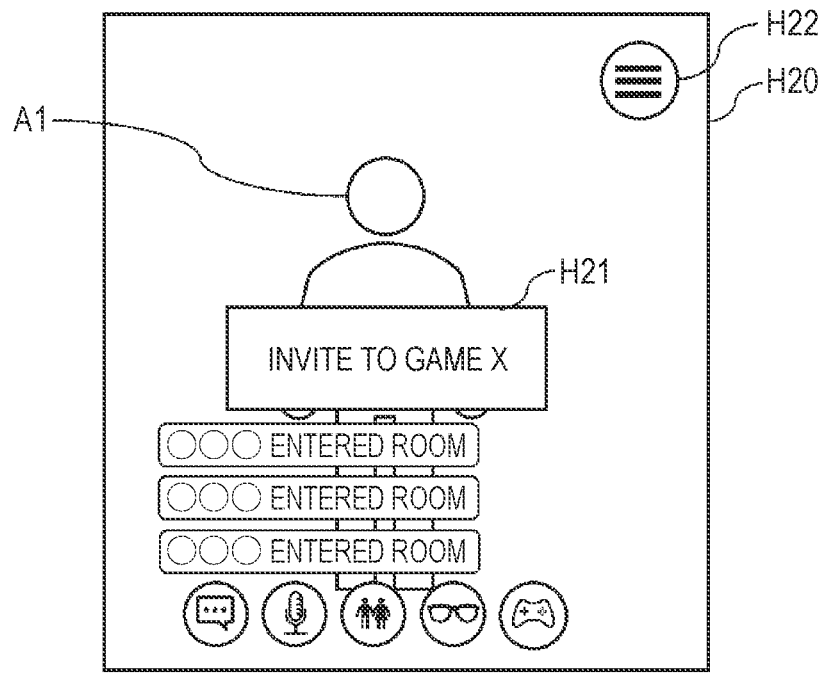
FIG. 22 is a conceptual diagram illustrating an exemplary embodiment of an image of a screen displayed on the user terminal.

Note that comments from viewing users, etc. illustrated in FIGS. 21 and 22 or gifts thrown (not illustrated), and menu icons H12 and H22 may not be illustrated in the following description.

In the present embodiment, it may be assumed that the predetermined game is a game having a flow in which each performing user presents an answer according to a given theme, discussion (description) on which answer is appropriate may be performed among performing users, votes from viewing users and/or performing users may be received for the presented answers, and an performing user giving an answer having a large number of votes may be awarded.

According to the game, it may be possible to activate communication between the performing users and to activate communication between the viewing user and the performing user.

Note that this game can be implemented as a game that can be played by the performing users in a collaboration moving image, and can be implemented as a multi-game that allows a user not appearing in the collaboration moving image to participate only in this game.

Figure 23:
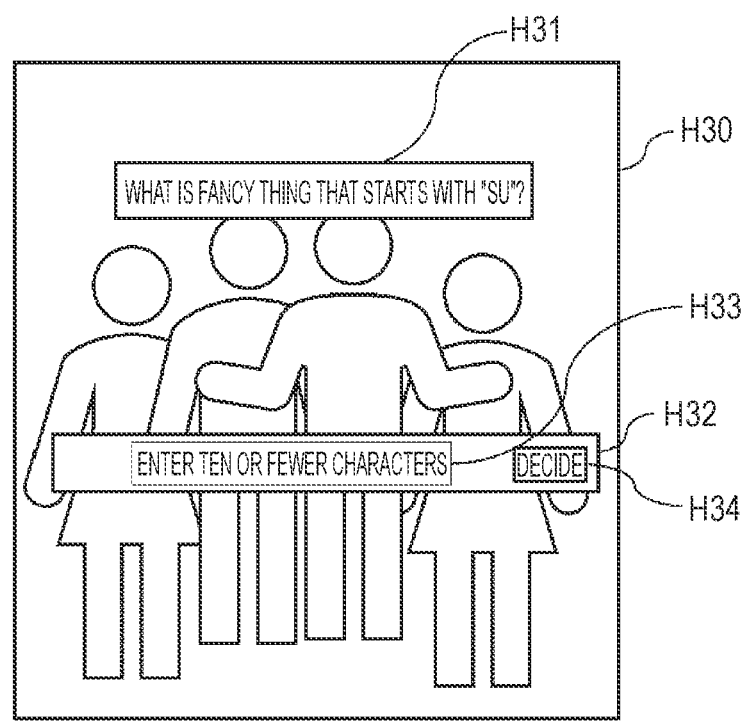
FIG. 23 is a conceptual diagram illustrating an exemplary embodiment of an image of a screen displayed on the user terminal.

Returning to FIG. 21, when the start object H11 is selected by the host user on the screen H10, the screen H10 may transition to a screen H30 illustrated in FIG. 23. A theme display field H31 and an answer input field H32 may be displayed on the screen H30. Note that a screen similar to the screen H30 may be displayed on a user terminal of the guest user.

Themes (subjects, quizzes, questions, etc.) may be displayed in the theme display field H31. It may be assumed that a theme may be automatically generated using a word extracted from a database described later.

As illustrated in FIG. 23, a character input field H33 and a decision button H34 may be displayed in the answer input field H32.

A screen keyboard may be set up on the screen H30 by selecting the character input field H33, and a character can be freely input within a designated number of characters using the screen keyboard.

Figure 24:
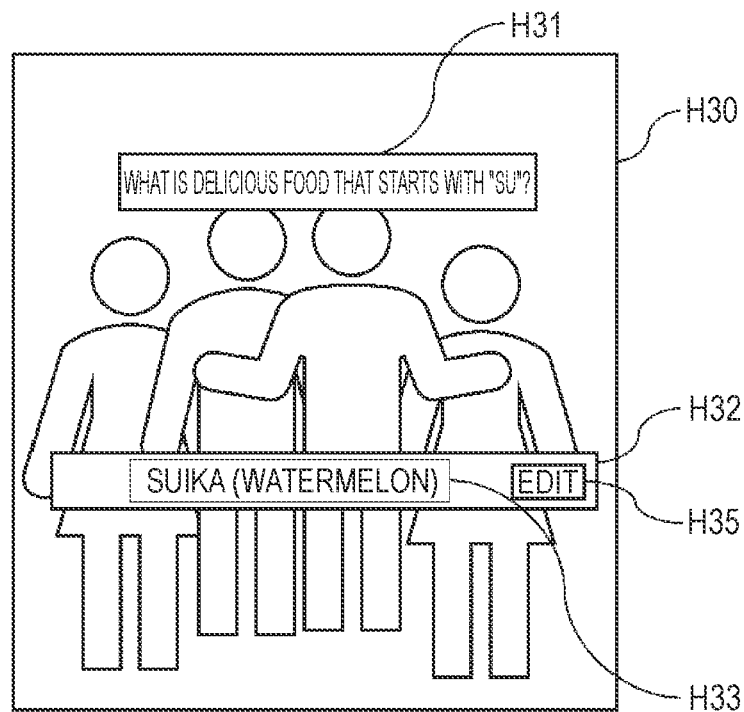
FIG. 24 is a conceptual diagram illustrating an exemplary embodiment of an image of a screen displayed on the user terminal.

Then, when the decision button H34 may be selected after the character may be input by the performing user, the input character may be displayed in the character input field H33 on the screen H30 (FIG. 24). At this time, the decision button H34 may change to an edit button H35. The performing user can change the input character by selecting the edit button H35.

Figure 25:
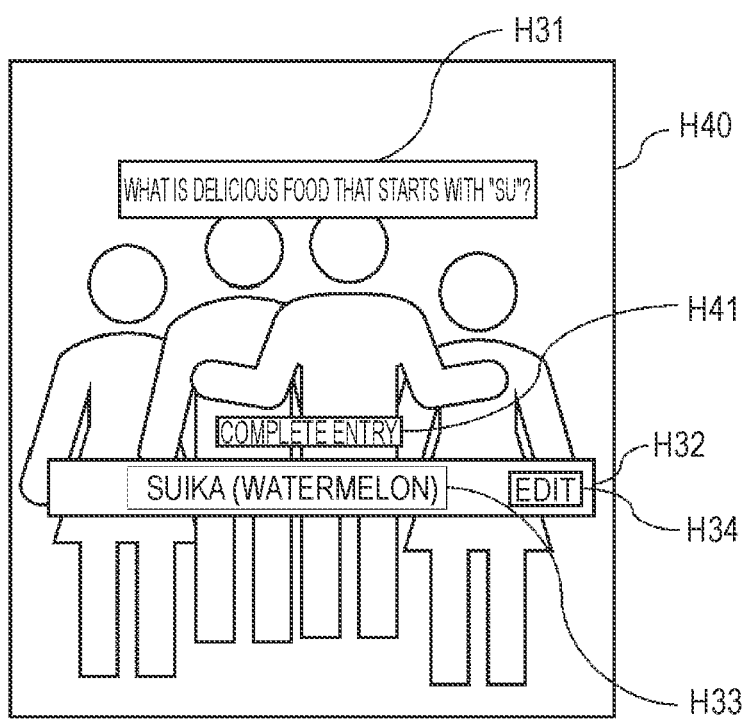
FIG. 25 is a conceptual diagram illustrating an exemplary embodiment of an image of a screen displayed on the user terminal.

Then, as illustrated in FIG. 25, an answer deadline object H41 may be displayed on a screen H40 displayed on the user terminal of the host user when a predetermined time elapses from the start of the game (selection of the start object H11).

As described above, the answer deadline object H41 may be displayed according to passage of the predetermined time, or may be displayed according to selection of the decision button H34 by all the performing users. Note that the screen H40 may be a screen displayed only to the host user, and the answer deadline object H41 may not be displayed on a screen of the guest user.

In addition, without displaying the answer deadline object H41 on the screen H40 displayed on the user terminal of the host user, the answer may be automatically closed according to the passage of the predetermined time or the selection of the decision button H34 by all the performing users.

Figure 26:
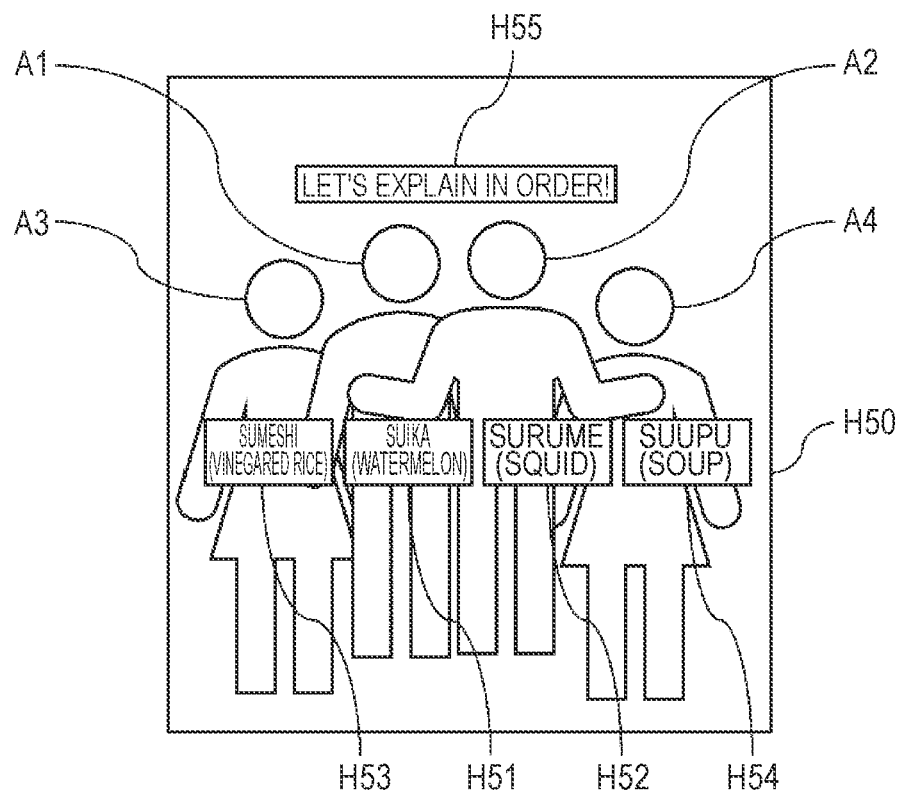
FIG. 26 is a conceptual diagram illustrating an exemplary embodiment of an image of a screen displayed on the user terminal.

As an example, when the answer deadline object H41 is selected by the host user, as illustrated in FIG. 26, a screen H50 on which answer objects H51 to 54 may be displayed to correspond to each of the plurality of character objects A1 to A4 may be displayed on the distributing user terminal of the performing user and the viewing user terminal of the viewing user.

In FIG. 26, the answer object H51 may correspond to the character object A1, the answer object H52 may correspond to the character object A2, the answer object H53 may correspond to the character object A3, the answer object H54 may correspond to the character object A4.

In this way, the character objects and the answer objects may be displayed such that a corresponding relationship may be recognizable. That is, content answered by each user can be identified. As an example, in FIG. 26, the corresponding relationship may be clarified by displaying the character objects and the answer objects close to each other.

Then, on the screen H50, an instruction field H55 may be displayed to indicate an instruction to explain answers (in FIG. 26, characters "Let's explain in order!").

Figure 27:
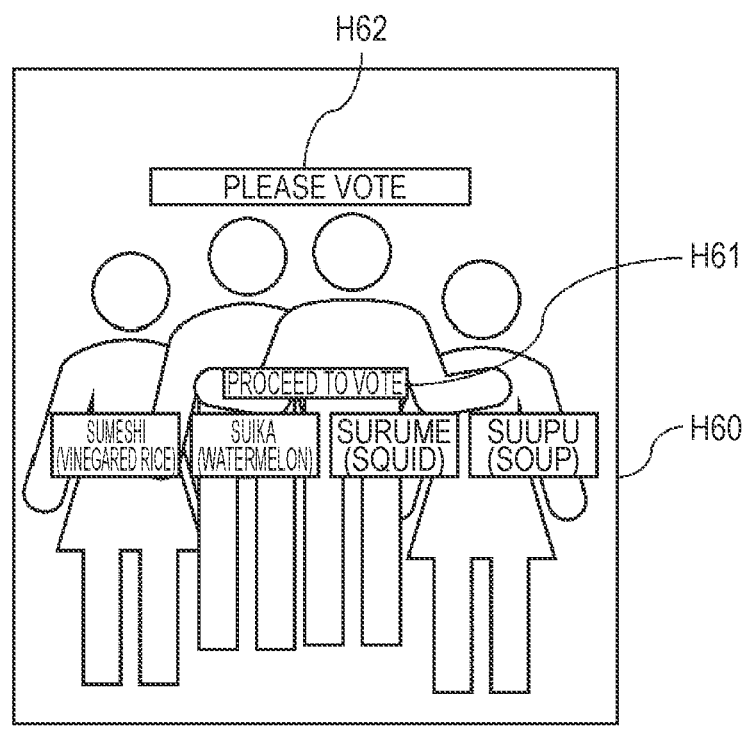
FIG. 27 is a conceptual diagram illustrating an exemplary embodiment of an image of a screen displayed on the user terminal.

Then, after the answer deadline object H41 may be selected by the host user, when the screen H50 may be displayed and a predetermine time elapses, as illustrated in FIG. 27, a screen H60, on which a voting start object H61 and an instruction field H62 indicating that voting is urged may be displayed, may be displayed on the user terminal of the host user. Note that the screen H60 may be a screen displayed only on the user terminal of the host user, and the voting start object H61 may not be displayed on a screen displayed on the viewing user terminal of the viewing user and the user terminal of the guest user.

Figure 28:
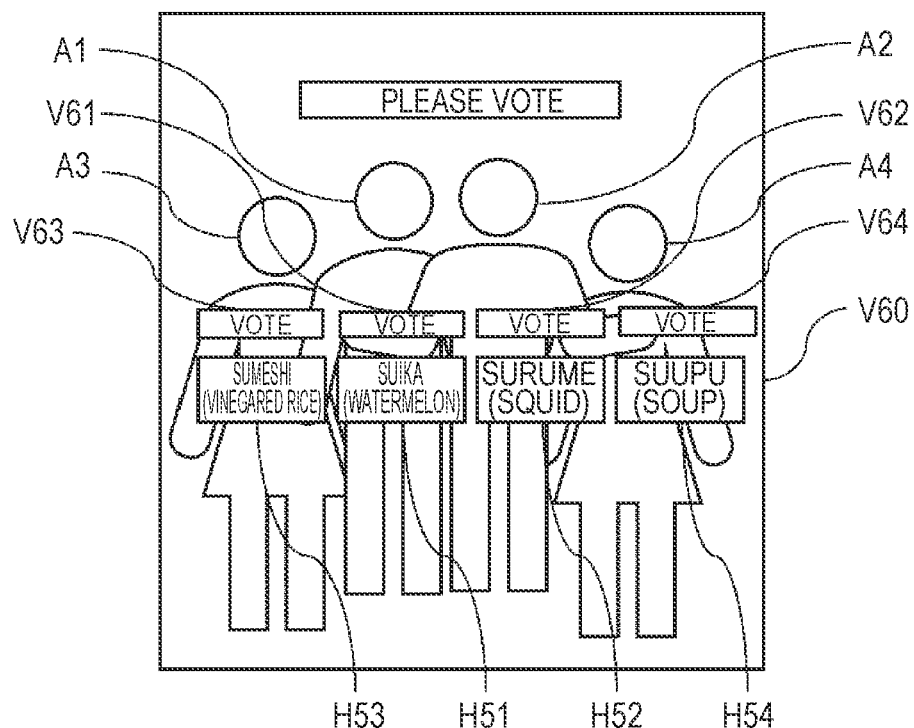
FIG. 28 is a conceptual diagram illustrating an exemplary embodiment of an image of a screen displayed on the user terminal.

When the voting start object H61 may be selected by the host user, a screen V60 illustrated in FIG. 28 may be displayed on the distributing user terminal of the performing user and the viewing user terminal of the viewing user.

Then, the first selection reception unit 420 may receive selection of at least one object from a plurality of objects corresponding to each of the plurality of character objects from the viewing user terminal of the viewing user viewing the moving image. According to an exemplary embodiment, there may be one-to-one correspondence between the plurality of objects available for selection and the plurality of character objects, so that each object in the plurality of objects available for selection is uniquely associated with one and only one object in the plurality of character objects.

A description will be given on the assumption that the plurality of objects mentioned here may be voting objects V61 to 64. However, without separately displaying the voting objects V61 to 64, the answer objects H51 to 54 may function as voting objects.

Further, the second selection reception unit 430 may receive selection of at least one object from the plurality of objects from the performing user terminal of the performing user.

Note that only an object corresponding to the own character object may not be displayed on the screen displayed on the performing user terminal. That is, it may be possible to adopt a rule in which voting for the own answer may not be allowed.

The number of objects that can be selected by the performing user or the viewing user may be predetermined (for example, once).

When the performing user or the viewing user can select a plurality of objects, selection of the objects can be given superiority or inferiority. Specifically, one object can be selected as a first-ranked answer, and another object can be selected as a second-ranked answer. Alternatively, it may be possible to rank and vote by allocating a plurality of selection rights to a plurality of objects. As an example, when the object can be selected three times, by selecting one object twice as a first-ranked answer and selecting another object once as a second-ranked answer, the selection can be given superiority or inferiority.

Further, the number of selectable objects may differ between the performing user and the viewing user, and the number may differ between the viewing users depending on the status. This status may include the cumulative number of instances in which gifting was performed to the moving image of the distributing user, the cumulative gifting amount, a cumulative viewing time, and presence/absence of following the distributing user.

Figure 29:
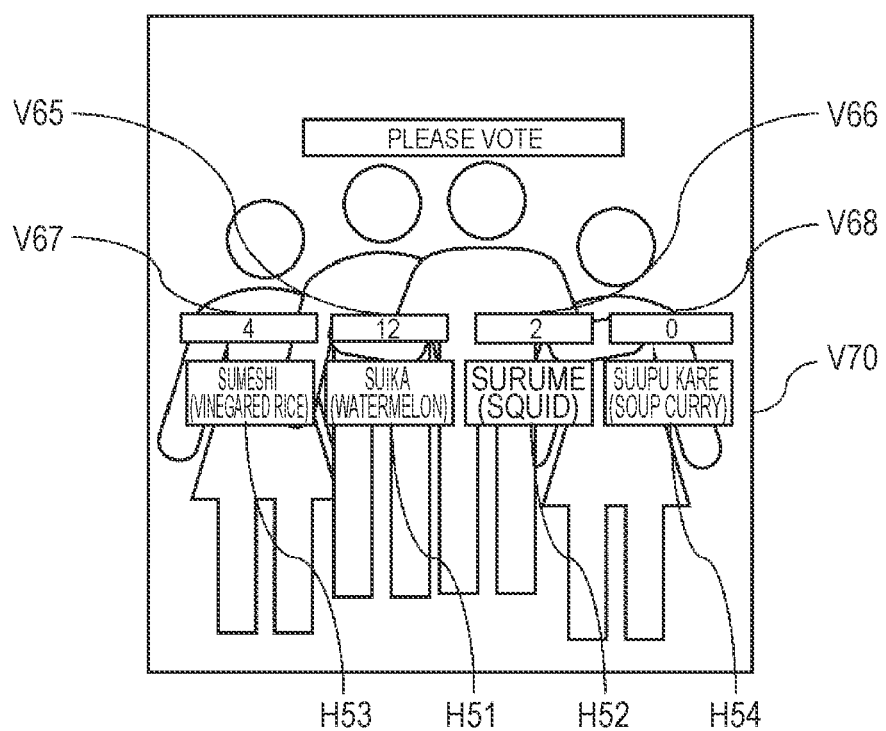
FIG. 29 is a conceptual diagram illustrating an exemplary embodiment of an image of a screen displayed on the user terminal.

When the own voting ends, the screen V60 may transition to a screen V70 illustrated in FIG. 29. That is, the voting objects V61 to 64 change to display fields V65 to 69 for the number of votes. However, this change may be optional, and the voting objects may be maintained or the voting objects may not be displayed.

Figure 30:
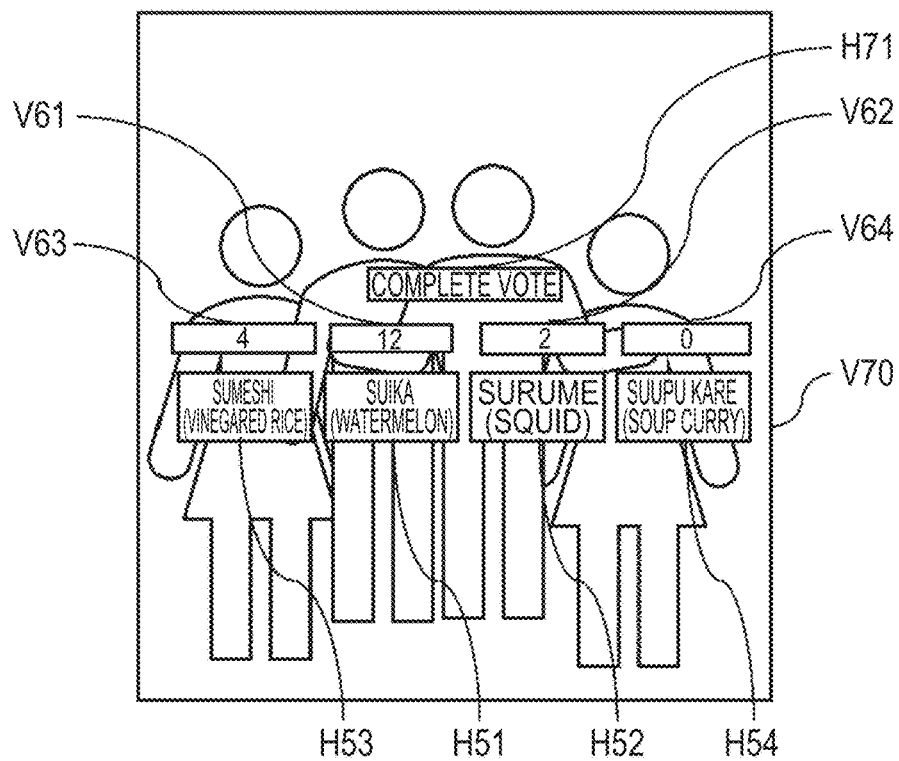
FIG. 30 is a conceptual diagram illustrating an exemplary embodiment of an image of a screen displayed on the user terminal.

Then, as illustrated in FIG. 30, on a screen H70 displayed on the user terminal (performing user terminal) of the host user, a voting end object H71 may be displayed after a predetermined time elapses from start of voting (selection of the voting start object H61). Note that the voting end object H71 may be displayed according to passage of a predetermined time, or may be displayed according to selection of the voting objects by all the performing users. Alternatively, the voting end object H71 may be displayed according to selection of the voting object by the viewing user reaching the specified number. Note that the screen H70 may be a screen displayed only on the user terminal of the host user, and the voting end object H71 may not be displayed on the screen displayed on the user terminal of the guest user or the viewing user.

The specification unit 440 may specify an performing user associated with a character object corresponding to an object having the largest number of selections received by the first selection reception unit 420 and the second selection reception unit 430.

In the present embodiment, the specification unit 440 may specify the character object A1 as the performing user associated with the object having the largest number of selections.

Note that in the present embodiment, the performing user specified by the specification unit 440 may be a character object corresponding to the object having the largest number of selections. However, the performing user may be a character object corresponding to an object having the smallest number of selections.

The number of selections received by the first selection reception unit 420 and the second selection reception unit 430 may be counted by an aggregation unit (not illustrated). Such a unit counts the number of the selections until a request for end of voting, which will be described later, may be made. Note that the selections received by the first selection reception unit 420 and the second selection reception unit 430 may both have the same weight. However, the selection received by the first selection reception unit 420 may be counted with a weight given to the selection received by the second selection reception unit 430. Specifically, 1 may be counted for each vote by the viewing user, whereas 10 may be counted for each vote by the performing user.

The association unit 450 may associate a specific object with a character object associated with an performing user specified by the specification unit 440.

The display processing unit 460 may generate information for displaying a specific object associated by the association unit 450 in association with a character object.

Figure 31A:
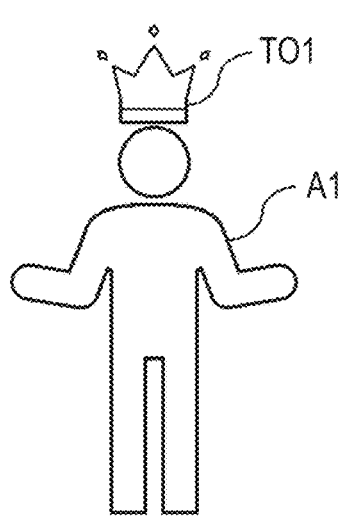
FIG. 31(*a*) is a conceptual diagram illustrating an exemplary embodiment of a mounting image of a specific object in the disclosure.
FIG. 31(b) is a conceptual diagram illustrating an exemplary embodiment of a mounting image of a specific object in the disclosure.
Figure 31B:
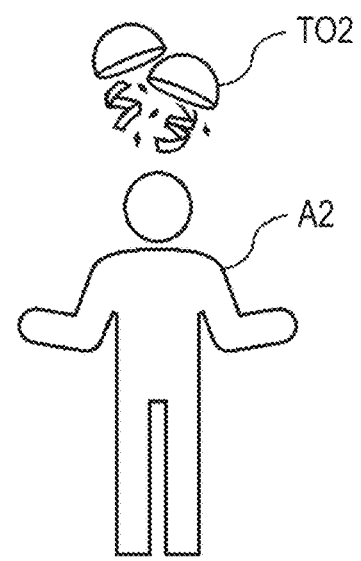

As an example, as illustrated in FIGS. 31A and 31B, the display processing unit 460 may display the character object A1 in association with a crown object TO1 as a specific object. As an example, a mode in which the crown object TO1 is attached to the character object A1 may be displayed. In addition, it may be assumed that a special effect object TO2 that makes a target character object stand out (an effect of popping a decorative paper ball on the character object so that confetti scatters, and an effect of causing glitter around the character object) may be included in the specific object corresponding to the character object.

Note that in the above example, the award may be given in the form of giving a specific object to the performing user associated with the character object corresponding to the object having the largest number of selections received by the first selection reception unit 420 and the second selection reception unit 430. However, an incentive may be given to a viewing user and/or an performing user making this selection. That is, the one or plurality of processors in the disclosure may include a reward granting unit (not illustrated). The content of the incentive may not be particularly limited, and may be a gacha ticket, a wearing object such as clothes or an accessory, a gift voucher, etc.

According to the above configuration, it may be possible to provide a technical improvement that solves or alleviates at least a part of the above-mentioned problems of the conventional art.

Specifically, according to the above configuration, it may be possible to activate communication between the performing users and to activate communication between the viewing user and the performing user.

In this way, by activating communication, it may be possible to improve the motivation of the distributor to distribute the moving image and/or the motivation of the viewer to view the moving image, and to liven up the moving image and improve the quality of the content.

Figure 32:
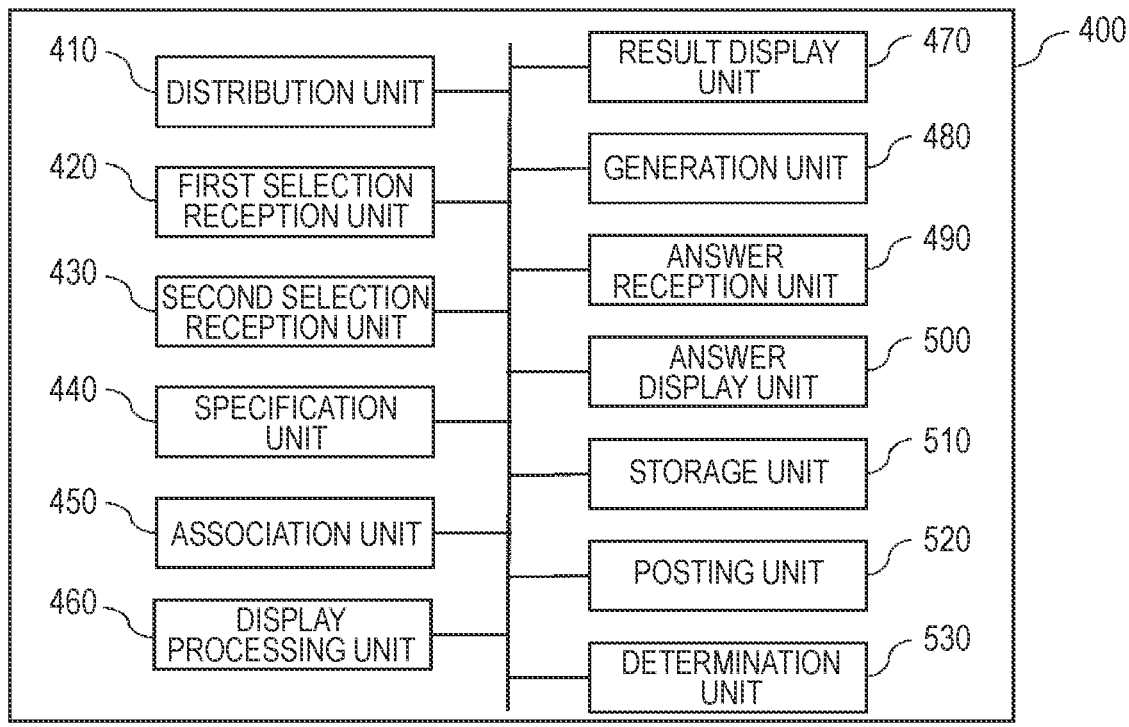
FIG. 32 is a conceptual diagram illustrating an exemplary embodiment of a functional configuration of the information processing apparatus in the disclosure.

The one or plurality of computer processors in the disclosure may further include a result display unit 470 as illustrated in FIG. 32.

The result display unit 470 may display a result screen showing performing user information related to an performing user specified by the specification unit 440 and selection user information related to a viewing user and/or an performing user selecting an object corresponding to a character object associated with the performing user.

Figure 33:
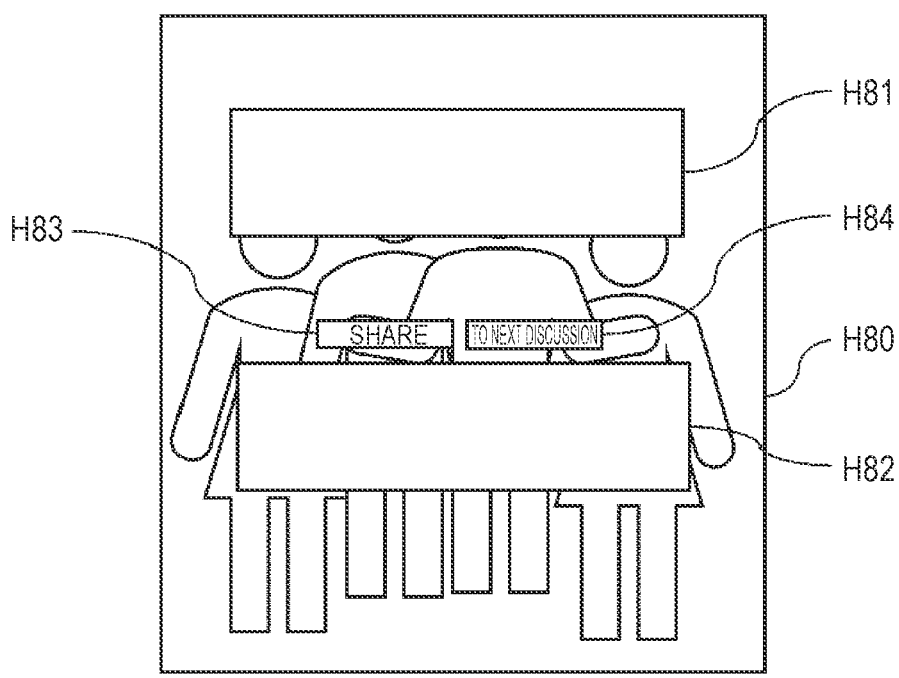
FIG. 33 is a conceptual diagram illustrating an exemplary embodiment of an image of a screen displayed on the user terminal.

FIG. 33 illustrates an image of a result screen H80 displayed on the user terminal of the host user. The result screen H80 can include a first result display field H81 and a second result display field H82. Details of display content of the first result display field H81 and the second result display field H82 will be described in detail with reference to FIGS. 34 and 35.

Figure 34:
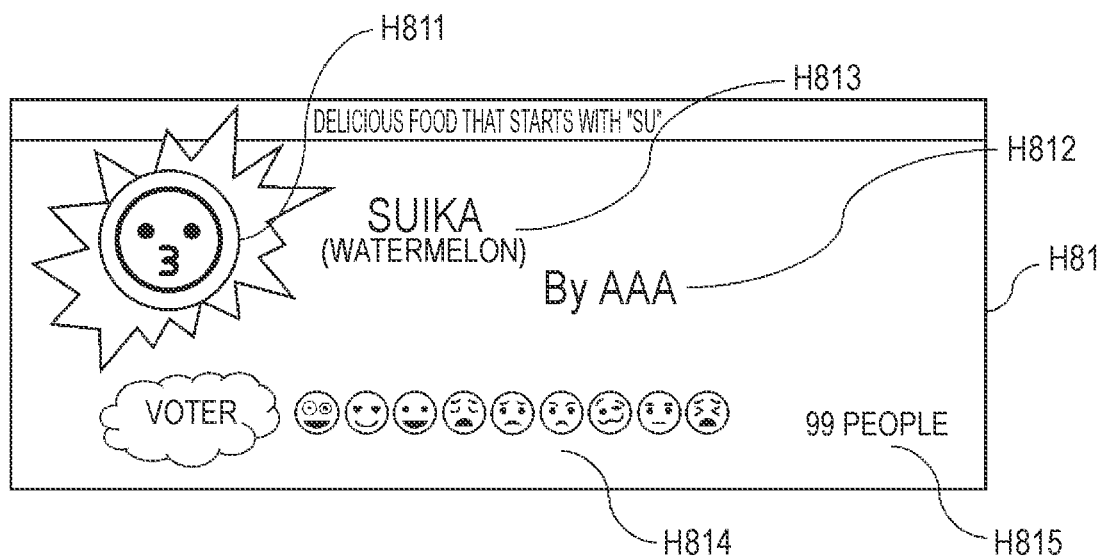
FIG. 34 is a conceptual diagram illustrating details of an exemplary embodiment of a first result display field illustrated in FIG. 33.

FIG. 34 is an image diagram illustrating details of content of the first result display field H81. As illustrated in FIG. 34, the first result display field H81 may display a profile picture H811 of the performing user and a name H812 of the performing user as performing user information related to the performing user specified by the specification unit 440. Further, an answer H813 of the performing user may be displayed.

Further, on the first result display field H81, selection user information related to the viewing user and/or the performing user selecting the object corresponding to the character object associated with the performing user may be displayed as the selection user information.

Specifically, as the selection user information, the result display unit 470 can display at least a part of an icon of the viewing user and/or the performing user selecting the object corresponding to the character object associated with the performing user and the number of selected objects.

Specifically, as illustrated in FIG. 34, on the first result display field H81, profile pictures (icons) H814 of selection users and the total number H815 of selection users may be displayed as selection user information related to the viewing user and/or the performing user selecting the object corresponding to the character object associated with the performing user.

Note that the profile pictures (icons) H814 of the selection users may be displayed in the order of voting, and can be displayed up to a predetermined upper limit. Alternatively, the profile pictures H814 of the selection users may be displayed in the order of voting in the order of the performing user and the viewing user. Note that it may be assumed that even the case where the number of votes exceeds the upper limit of the icon display may be reflected in the total number H815 of selection users.

Figure 35:
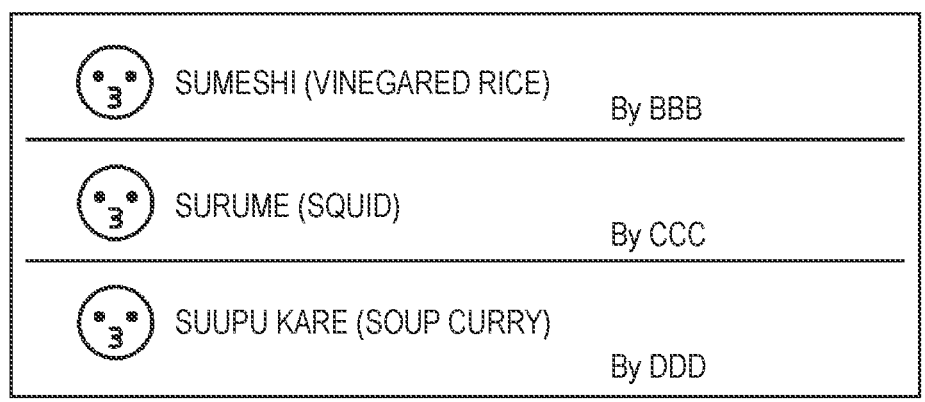
FIG. 35 is a conceptual diagram illustrating details of an exemplary embodiment of a second result display field illustrated in FIG. 33.

Further, in the second result display field H82, as illustrated in FIG. 35, it can be assumed that icons, answers, and names of performing users other than the specified performing user can be displayed in the order of votes. Note that although not illustrated, similarly to the first result display field H81, for each performing user, as selection user information related to a viewing user and/or an performing user selecting an object corresponding to a character object associated with the performing user, it may be possible to display profile pictures of selection users and the total number of selection users.

Note that even though a description has been given on the assumption that the first result display field H81 and the second result display field H82 may be separately displayed, both the result display fields may be displayed in one result display field.

In addition, the one or plurality of computer processors may further include a posting unit 520, as illustrated in FIG. 32.

The posting unit 520 posts a result screen displayed by the result display unit 470 to an external SNS service.

Specifically, the posting unit 520 posts according to selection of a share button H83 displayed on the screen H80 illustrated in FIG. 33 by the host user. Note that the share button H83 may be displayed not only on the host user terminal but also on the guest user terminal or the viewing user terminal.

Further, the posted result screen may include at least the character objects A1 to A4 and the first result display field H81, and display of other buttons, objects, etc. may be omitted.

Then, the posting unit 520 posts a result screen together with information related to the moving image.

The information related to the moving image may be information such as link information for advancing to the viewing screen of the moving image or a hash tag "#○○○○○ (game name)" for searching.

In this way, while leaving a result as a memorial, it may become possible to invite users seeing such a post to the moving image.

Next, generation of the "theme" illustrated in FIG. 23 will be described in detail.

As illustrated in FIG. 32, the one or plurality of computer processors in the disclosure further may include a generation unit 480, an answer reception unit 490, and an answer display unit 500.

The generation unit 480 may generate and may display a first theme based on a request from an performing user terminal of a specific performing user among a plurality of performing users.

Specifically, as illustrated in FIG. 21, a request may be made to generate the first theme according to selection of the game start object H11 displayed on the screen H10 displayed on the user terminal of the host user.

As described above, it may be assumed that the plurality of performing users may include a host user distributing the moving image and one or more guest users participating in the moving image, and the specific performing user may be the host user.

The generation unit 480 can generate at least the first theme using at least one of a first part extracted from a first database and including one or a plurality of clauses and a second part extracted from a second database and including one or a plurality of clauses. According to an exemplary embodiment, clauses in the plurality of clauses of the first part and the plurality of clauses of the second part may be extracted based on the preferences of any or all of the performers and viewers, such as the preferences of the host user, the preferences of the guest users, or a combination of the two, based on past and present information associated with the host user and/or the guest users. For example, according to an exemplary embodiment, clauses may be extracted based on one or more predetermined fields of interest of the host user or guest users designated at an initial stage, may be extracted based on themes selected by past performers and viewers or by the current host user and guest users in the past, may be extracted based on previous answers, or based on any other suitable information. To provide an example, if a theme related to history has been selected often in the past (for example, if this theme had been selected often by the current host user or guest users, if this theme had been popular in previous groups including both current and past users, or if this theme has recently been popular with all players of the game) then a theme related to history may be selected in a present instance or may be more likely to be selected in a present instance. To provide another example, it may be contemplated for the basic information related to the users to be used to select clauses in the plurality of clauses; in various exemplary embodiments, the ages, genders, regions of residence, nationalities, and so forth of users may be used to select clauses in the plurality of clauses. For example, depending on the age groups or most common age group of the users, clauses that are more likely to be selected by participants in that age group (based, for example, on past games) may be selected.

FIG. 36 is a diagram illustrating an image of the first database. As illustrated in FIG. 36, an identification number and the first part including the one or plurality of clauses may be stored in the first database in association with each other.

Similarly, FIG. 37 is a diagram illustrating an image of the second database. As illustrated in FIG. 37, an identification number and the second part including the one or plurality of clauses may be stored in the second database in association with each other.

As an example, in the case of extracting "start with "su"" (identification number 100013) from the first database and extracting "delicious food" (identification number 200001) from the second database, the generation unit 480 can generate the first theme "delicious food that starts with "su"".

As another example, the generation unit 480 can extract "Christmas" (identification number 100100) from the first database and generate the first theme "Christmas". The performing user can create a haiku and create an illustration based on the first theme "Christmas". In this way, the performing user can freely arrange the second part and proceed with the game.

Note that the number of databases is not limited to two, and it may be possible to prepare more databases and generate the first theme in a more complicated manner.

The extraction may be performed with a random probability, or an extraction probability may be changed according to a season, an event, etc.

Then, the answer reception unit 490 may receive answers from performing user terminals of a plurality of performing users to the first theme displayed by the generation unit 480.

The answers on the performing user terminals can be input via the answer input field H32 illustrated in FIG. 23. Note that the answer input field H32 may not be limited to the field that receives input of characters; in another exemplary embodiment, the answer input field H32 may be the field that receives handwritten characters and illustrations.

Then, the answer display unit 500 may display the answers received by the answer reception unit 490.

Specifically, the answer objects H51 to 54 may be displayed on the screen V60 as illustrated in FIG. 26. Note that a display position of this answer can be a position corresponding to each of the character objects A1 to A4.

Note that in FIG. 26, the answer object H51 may correspond to the character object A1, the answer object H52 may correspond to the character object A2, the answer object H53 may correspond to the character object A3, the answer object H54 may correspond to the character object A4.

In this way, a corresponding relationship between the character object and the answer object may be displayed in a recognizable manner. As an example, in FIG. 26, the correspondence relationship may be clarified by displaying the character object and the answer object close to each other. However, the correspondence relationship may be clarified by connecting using a line object, giving a name of an performing user giving an answer, etc.

Then, the plurality of objects may be displayed at positions corresponding to answers displayed by the answer display unit 500.

Specifically, as illustrated in FIG. 28, the voting objects V61 to 64 may be displayed as the plurality of objects in the vicinity of each of the answer objects H51 to 54.

The answer object H51 may correspond to the voting object V61, the answer object H52 may correspond to the voting object V62, the answer object H53 may correspond to the voting object V63, the answer object H54 may correspond to the voting object V64.

In this way, a corresponding relationship between the plurality of voting objects and the answer objects may be displayed in a recognizable manner. As an example, in FIG. 28, the correspondence relationship may be clarified by displaying the voting objects and the answer objects close to each other. However, the correspondence relationship may be clarified by connecting the voting objects and the answer objects using line objects, giving a name of an performing user giving an answer, etc.

The, the first selection reception unit 420 can start receiving selection in response to a start request from an performing user terminal of a specific performing user among performing users, and end receiving selection in response to an end request from an performing user terminal of a specific performing user.

As an example, it may be assumed that a start request may be made by selecting a button H61 for proceeding to voting by the host user on the screen H60 illustrated in FIG. 27, and an end request may be made by selecting a button H71 for closing voting illustrated in FIG. 30.

As illustrated in FIG. 32, the one or plurality of computer processors in the disclosure may further include a storage unit 510.

When the generation unit 480 may generate and may display the first theme based on a request from an performing user terminal of a specific performing user among a plurality of performing users, the storage unit 510 may store information related to the plurality of performing users.

A storage device for storing such information may be included in the information processing terminal 100 of the host user, and may be included in the server apparatus (information processing apparatus 400).

Then, when the host user selects the game start object H11 illustrated in FIG. 21, the host user selects the game start object H11, performing users appearing in the moving image (users associated with the character objects A1 to A4 in the present embodiment) may be determined and stored as participating users.

Thereafter, it may be assumed that even when one or two of the participating users leave the collaboration moving image and the performing users are missing/replaced, this game may be continued. However, even when another guest user not stored as an performing user participates in the collaboration moving image, it may be assumed that the guest user cannot enter an answer and may not be subjected to voting until an update timing of information described later. However, it may be assumed that a character object of the other guest user may be displayed at a designated position in the moving image.

Then, the plurality of objects can be moved along with movement of the plurality of character objects.

The movement of the plurality of character objects may occur due to exit of the participating user from the collaboration moving image and entry of another guest user.

For example, in the screen V60 illustrated in FIG. 28, when the guest user of the character object A2 leaves, the character object A2 may be hidden. Then, the character object A3 may be moved to and displayed at a position where the character object A2 may be previously displayed, and similarly, the character object A4 may be moved to and displayed at a position where the character object A3 may be previously displayed.

At this time, the answer object H52 and the voting object V62 of the character object A2 may be hidden, the answer object H53 and the voting object V63 of the character object A3 may be displayed near a moving destination of the character object A3, and similarly, the answer object H54 and the voting object V64 of the character object A4 may be displayed near a moving destination of the character object A4.

According to such a configuration, since the corresponding relationship between the answer object, the voting object, and the character object may not be broken, it may be possible to prevent a mistake in a voting destination. In further exemplary embodiments, it may be contemplated for other techniques to be provided in order to prevent a mistake in a voting destination by changing a display position of the objects. For example, in some cases, it may be contemplated for an object to become less visible when a viewer changes a viewpoint position of the camera, since the object may be wholly or partially obscured by other objects or avatars within the game. In such cases, it may be contemplated for the system to determine, after each change to the viewpoint position or on some other basis (such as periodically), whether there are objects or avatars between an object to be voted on and a viewpoint position of a viewer that could wholly or partially obscure the visibility of the object from the perspective of the viewer. In these cases, if it is determined that there are avatars or other objects between the object and the viewpoint position, the position of the object to be voted on may then be adjusted in order to ensure that the object is outside of the overlapping range of the other objects or avatars that would otherwise overlap with the object to be voted upon.

After displaying the result screen by the result display unit 470, the storage unit 510 can update information related to the plurality of performing users based on a request from the performing user terminal of the specific performing user.

Specifically, as illustrated in FIG. 33, it may be assumed that the information may be updated when the generation unit 480 generates and displays the second theme according to selection of a button H84 for proceeding to the next discussion displayed on the result screen H80 displayed on the user terminal of the host user.

Note that it may be assumed that the button H84 for proceeding to the next discussion may be displayed when a predetermined time elapses after display of the result screen H80 starts.

In this way, in the game of the disclosure, an performing user may be determined every turn and information may be updated when a turn from a next theme display to a result display starts according to selection of the button H84 for proceeding to the next discussion by the host user.

According to such a configuration, by updating information of a user participating in the game at an appropriate timing in one moving image, even when the guest user enters and leaves in the middle, an appropriate progress of the game can be achieved.

Next, a detailed description will be given of an exemplary embodiment of a method of specifying an award target when there is a plurality of objects having the largest number of selections received by the first selection reception unit 420 (that is, when the number of votes obtained is the same).

The one or plurality of computer processors in the disclosure may further include a determination unit 530, as illustrated in FIG. 32.

The determination unit 530 may determine whether or not there is one object having the largest number of selections received by the first selection reception unit 420.

Then, when the determination unit 530 determines that there is one object having the largest number of selections, the specification unit 440 may specify one performing user associated with a character object related to the one object having the largest number of selections.

On the other hand, when the determination unit 530 determines that there is a plurality of objects having the largest number of selections, one performing user may be specified according to a predetermined priority from a plurality of performing users associated with character objects associated with the plurality of objects having the largest number of selections.

The predetermined priority can be, for example, the order of the host user and the guest user. The priority among guest users can be the order of entry into the moving image. Alternatively, the priority may be determined based on the number of followers, the number of times of gifting, a distribution time, etc. of each of the host user and the guest user.

In the embodiment, a description has been given on the assumption that voting may be performed by selecting a voting object. However, voting may be performed by throwing a provided gift. Specifically, voting can be made on a target answer by numbering each answer of a plurality of character objects and throwing a gift with a corresponding number. Further, the voting by selecting the voting object and the voting by throwing the gift may be selected by a voting user. At this time, when the gift is charged, the voting by the gift may be weighted and counted. In an exemplary embodiment, it may be possible for gifts used as voting objects to have different weights, which may, for example, vary based on the different themes. In one such exemplary embodiment, themes and gifts may each be associated with attributes, and a weight applied to a gift used as a voting object may depend on the degree of similarity or other correspondence between an attribute of the theme and an attribute of the gift used as a voting object for the theme. In an exemplary embodiment where a gift may have a variable weight when used as a voting object, for example if used as a voting object on a first theme as opposed to a second theme, users may be presented with one or more gifts that are valid for a current theme, which may be displayed to each of the users along with an indication that the gifts are valid for the current theme. It may then be contemplated to display a weight on the screen associated with the gifts that are displayed to the users in association with the current theme, which may vary according to the relationship between the gift and the theme in order to make it easier for the user to select a gift that is effective for a given theme (e.g. a gift which has a high degree of correspondence with the theme based on the attributes of the gift and the theme).

In the embodiment, when the first theme may be generated and displayed based on a request from a specific performing user terminal, information related to a plurality of performing users may be stored. Therefore, when a user leaving the collaboration moving image in the middle enters the room again before the next information may be updated, game information related to the user may be restored. That is, it can be assumed that an answer object and a voting object of the user can be displayed again as the game progresses.

In the embodiment, it may be assumed that even when answers by performing users are the same, votes may be aggregated as separate answers. However, the same answers may be aggregated together. Specifically, the number of votes for each of the same answers may be added up, and when the number of votes may be the largest, all of a plurality of performing users giving the same answers may be awarded.

In the embodiment, a description has been given on the assumption that the predetermined game may be a game having a flow in which each performing user presents an answer according to a given theme, discussion (description) on which answer may be appropriate may be performed among performing users, votes from viewing users and/or performing users may be received for the presented answers, and an performing user giving an answer having a large number of votes may be awarded. However, it may be possible to apply this configuration as a voting game (popularity voting) for character objects. In this case, it can be unnecessary to display a theme, an answer object, etc.

According to the above configuration, it may be possible to provide a technical improvement that solves or alleviates at least some of the problems of the related art described above. Specifically, it may be possible to provide an information processing system capable of improving a motivation of a distributor to distribute the moving image and/or a motivation of a viewer to view the moving image.

Next, a description will be given of an information processing method in the embodiment of the disclosure.

Figure 3:
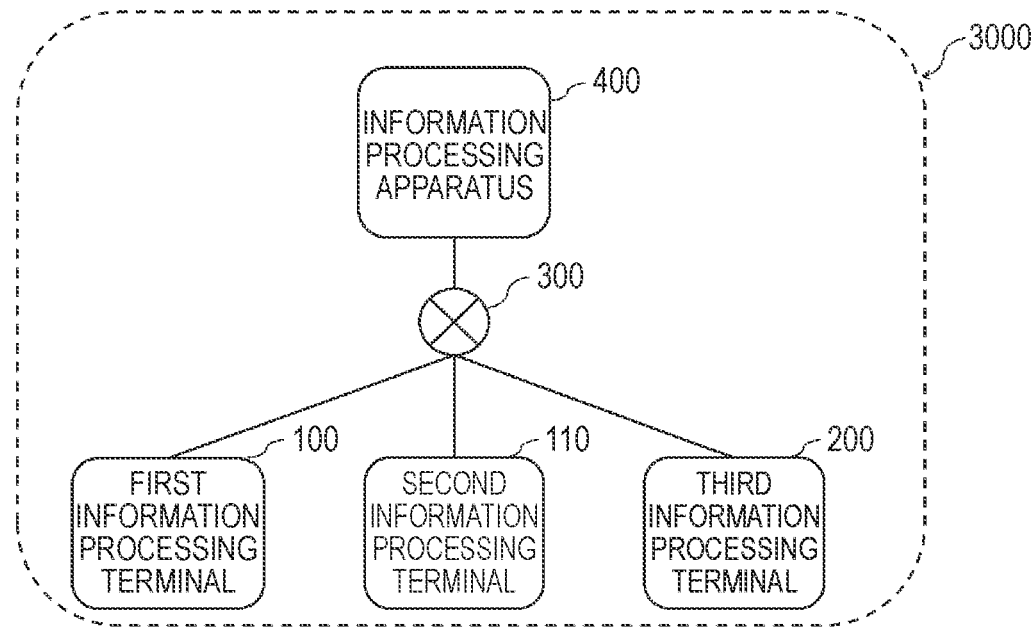
FIG. 3 is a system configuration diagram illustrating an exemplary embodiment of an information processing system in the disclosure.

As illustrated in FIG. 3, the information processing method in the embodiment of the disclosure may be an information processing method in the information processing system 3000 that may distribute moving images. The information processing system 3000 may include the first information processing terminal 100, the second information processing terminal 110, the third information processing terminal 200, and the information processing apparatus 400 (server apparatus 400).

Figure 38:
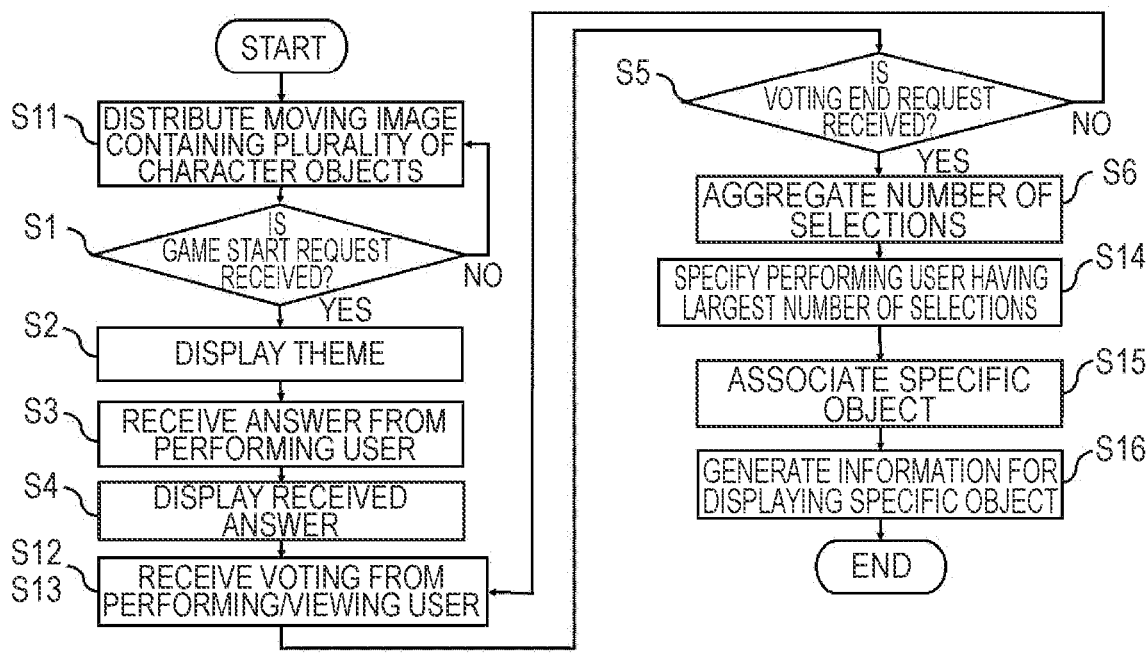
FIG. 38 is a flowchart illustrating an exemplary embodiment of a flow of an information processing method in the disclosure.

As illustrated as an example in FIG. 38, the information processing method in the disclosure may be characterized by causing the one or plurality of computer processes included in the information processing system to execute a distribution step S11, a first selection reception step S12, a second selection reception step S13, a specification step S14, an association step S15, and a display processing step S16.

As described above, in the present embodiment, a description has been given on the assumption that the one or plurality of computer processors may be included in the information processing apparatus 400. However, the one or plurality of computer processors may be shared by the information processing apparatus 400, the first information processing terminal 100, the second information processing terminal 110, and the third information processing terminal 200.

The distribution step S11 may distribute a moving image containing a plurality of character objects associated with a plurality of performing users. The distribution step S11 can be executed by the distribution unit 410.

The first selection reception step S12 may receive selection of one object from a plurality of objects corresponding to each of the plurality of character objects from the viewing user terminal of the viewing user viewing the moving image. The first selection reception step S12 can be executed by the first selection reception unit 420.

The second selection reception step S13 may receive selection of one object from a plurality of objects from the performing user terminal of the performing user. The second selection reception step S13 can be executed by the second selection reception unit 430.

The specification step S14 may specify an performing user associated with a character object corresponding to an object having the largest number of selections received in the first selection reception step S12 and the second selection reception step S13. The specification step S14 can be executed by the specification unit 440.

The association step S15 may associate a specific object with the character object associated with the performing user specified in the specification step S14. The association step S15 can be executed by the association unit 450.

The display processing step S16 may generate information for displaying the specific object associated in the association step S15 in association with the character object. The display processing step S16 can be executed by the display processing unit 460.

According to the above configuration, it may be possible to provide a technical improvement that solves or alleviates at least a part of the above-mentioned problems of the conventional art.

Further, as illustrated as an example in FIG. 38, the information processing method the disclosure can further cause the one or plurality of computer processors included in the information processing system to execute steps S1 to S6.

In step S1, it may be determined whether or not a game start request has been received from the first information processing terminal 100. The game start request may be made by the host user selecting the start object H11 on the screen 810 illustrated in FIG. 21.

In step S2, a theme may be displayed in response to the game start request. Step S2 can be executed in the generation unit 480.

In step S3, an answer to the theme from the performing user may be received. Step S3 can be executed in the answer reception unit 490.

In step S4, the answer received in step S3 may be displayed. Step S4 can be executed in the answer display unit 500.

In step S5, it may be determined whether or not a voting end request has been received from the first information processing terminal 100. It may be assumed that the end request is made by selecting the button H71 for closing voting on the screen H70 illustrated in FIG. 30 by the host user.

In step S6, the number of selections received by the first selection reception unit 420 and the second selection reception unit 430 may be aggregated. Step S6 can be executed in the aggregation unit.

Next, a description will be given of a computer program according to an exemplary embodiment of the disclosure.

As illustrated in FIG. 3, the computer program according to an exemplary embodiment of the disclosure may be a computer program executed by the information processing system 3000 that may distribute moving images. The information processing system 3000 may include the first information processing terminal 100, the second information processing terminal 110, the third information processing terminal 200, and the information processing apparatus 400 (server apparatus 400).

The computer program according to the exemplary embodiment may be characterized by causing one or a plurality of processors included in the information processing system to implement a distribution function, a first selection reception function, a second selection reception function, a specification function, an association function, and a display processing function.

The distribution function may distribute a moving image containing a plurality of character objects associated with a plurality of performing users.

The first selection reception function may receive selection of one object from a plurality of objects corresponding to each of a plurality of character objects from the viewing user terminal of the viewing user viewing the moving image.

The second selection reception function may receive selection of one object from a plurality of objects from the performing user terminal of the performing user.

The specification function may specify an performing user associated with a character object corresponding to an object having the largest number selections received by the first selection reception function and the second selection reception function.

The association function may associate a specific object with the character object associated with the performing user specified by the specification function.

The display processing function may generate information for displaying a specific object associated by the association function in association with the character object.

Figure 39:
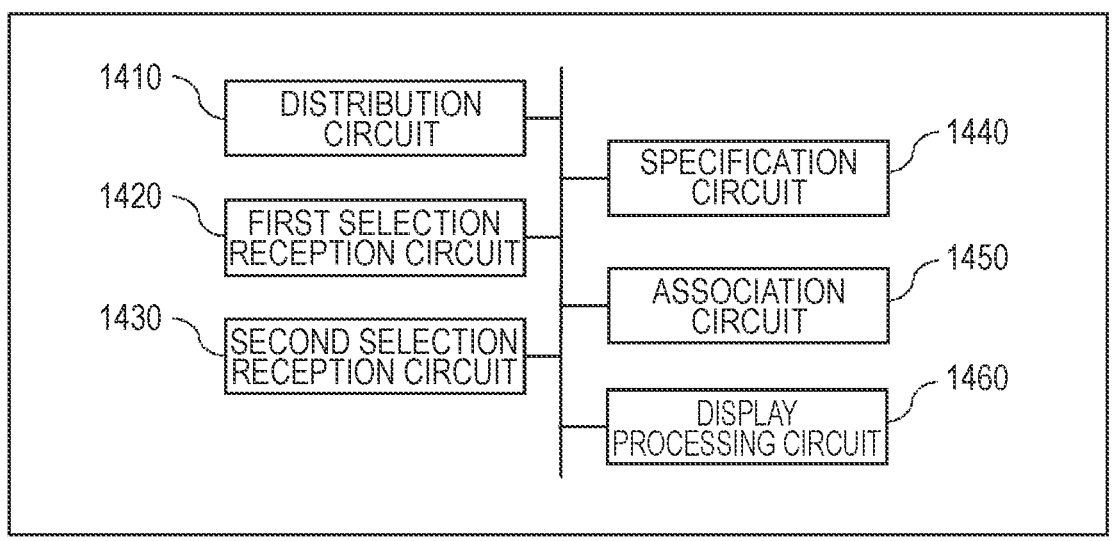
FIG. 39 is a circuit configuration diagram illustrating an exemplary embodiment of a circuit configuration for realizing a computer program in the disclosure.

The functions can be realized by a distribution circuit 1410, a first selection reception circuit 1420, a second selection reception circuit 1430, a specification circuit 1440, an association circuit 1450, and a display processing circuit 1460 illustrated in FIG. 39. It may be assumed that the distribution circuit 1410, the first selection reception circuit 1420, the second selection reception circuit 1430, the specification circuit 1440, the association circuit 1450, and the display processing circuit 1460 may be realized by the distribution unit 410, the first selection reception unit 420, the second selection reception unit 430, the specification unit 440, the association unit 450, and the display processing unit 460, respectively. Details of the respective units have been described above.

According to the above configuration, it may be possible to provide a technical improvement that solves or alleviates at least a part of the above-mentioned problems of the conventional art.

Next, a description will be given of the first information processing terminal (host user terminal) 100 according to an exemplary embodiment of the disclosure.

As illustrated in FIG. 3, the first information processing terminal 100 in the embodiment of the disclosure may be included in the information processing system 3000 that may distribute moving images. The information processing system 3000 further may include the second information processing terminal 110, the third information processing terminal 200, and the information processing apparatus 400 (server apparatus 400).

Figure 40A:
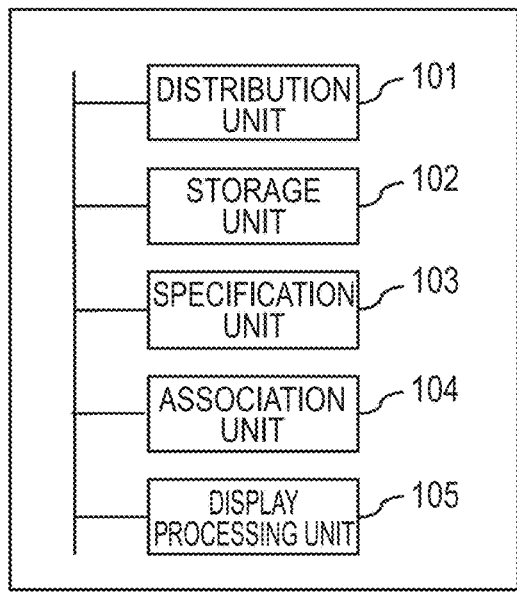
FIG. 40(a) is a configuration diagram illustrating an exemplary embodiment of a functional configuration of a first information processing terminal in the disclosure.

Further, illustrated in FIG. 40(a), the first information processing terminal 100 may be characterized by including a distribution unit 101, a storage unit 102, a specification unit 103, an association unit 104, and a display processing unit 105.

The distribution unit 101 may distribute a moving image containing a plurality of character objects associated with a plurality of performing users. The distribution unit 101 may be the distribution unit 410.

The storage unit 102 may store information related to a plurality of performing users. The distribution unit 101 may be the storage unit 510.

The specification unit 103 may specify an performing user associated with a character object corresponding to an object most selected as one object from a plurality of objects corresponding to each of a plurality of character objects from a viewing user terminal of a viewing user viewing the moving image and most selected as one object from a plurality of objects from an performing user terminal of an performing user. The specification unit 103 may be the specification unit 440.

The association unit 104 may associate a specific object with the character object associated with the performing user specified by the specification unit 103. The association unit 104 may be the association unit 450.

The display processing unit 105 may generate information for displaying a specific object associated by the association unit 104 in association with the character object. The display processing unit 105 may be the display processing unit 460.

According to the above configuration, it may be possible to provide a technical improvement that solves or alleviates at least a part of the above-mentioned problems of the conventional art.

Next, a description will be given of a computer program for the first information processing terminal according to an exemplary embodiment of the disclosure.

As illustrated in FIG. 3, the computer program according to the exemplary embodiment may be a computer program executed the information processing terminal 100 having a large scale included in the information processing system 3000 that may distribute moving images. The information processing system 3000 further may include the second information processing terminal 110, the third information processing terminal 200, and the information processing apparatus 400 (server apparatus 400).

Further, the computer program may be characterized by causing the one or plurality of computer processors included in the first information processing terminal 100 to implement the distribution function, the storage function, the specification function, the association function, and the display processing function.

The distribution function may distribute a moving image containing a plurality of character objects associated with a plurality of performing users.

The storage function may store information related to the plurality of performing users.

The specification function may specify an performing user associated with a character object corresponding to an object most selected as one object from a plurality of objects corresponding to each of a plurality of character objects from a viewing user terminal of a viewing user viewing the moving image and most selected as one object from a plurality of objects from an performing user terminal of an performing user.

The association function may associate a specific object with the character object associated with the performing user specified by the specification function.

The display processing function may generate information for displaying the specific object associated by the association function in association with a character object.

Figure 40B:
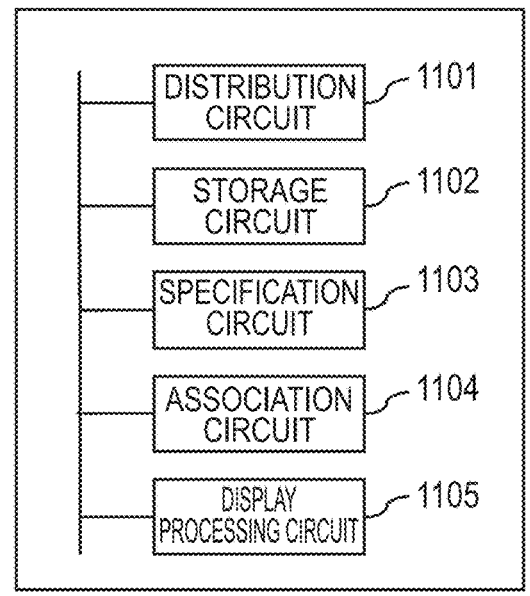
FIG. 40(b) is a circuit configuration diagram illustrating an exemplary embodiment of a circuit configuration for realizing a function of a program for the first information processing terminal in the disclosure.

The above functions can be realized by a distribution circuit 1101, a storage circuit 1102, a specification circuit 1103, an association circuit 1104, and a display processing circuit 1105 illustrated in FIG. 40(b). It may be assumed that the distribution circuit 1101, the storage circuit 1102, the specification circuit 1103, the association circuit 1104, and the display processing circuit 1105 may be realized by the distribution unit 101, the storage unit 102, the specification unit 103, the association unit 104, and the display processing unit 105, respectively. Details of the respective units have been described above.

According to the above configuration, it may be possible to provide a technical improvement that solves or alleviates at least a part of the above-mentioned problems of the conventional art.

Next, a description will be given of an information processing method in the first information processing terminal according to an exemplary embodiment of the disclosure.

As illustrated in FIG. 3, the information processing method according to the exemplary embodiment may be an information processing method executed by the first information processing terminal 100 included in the information processing system 3000 that may distribute moving images. The information processing system 3000 further may include the second information processing terminal 110, the third information processing terminal 200, and the information processing apparatus 400 (server apparatus 400).

Figure 41:
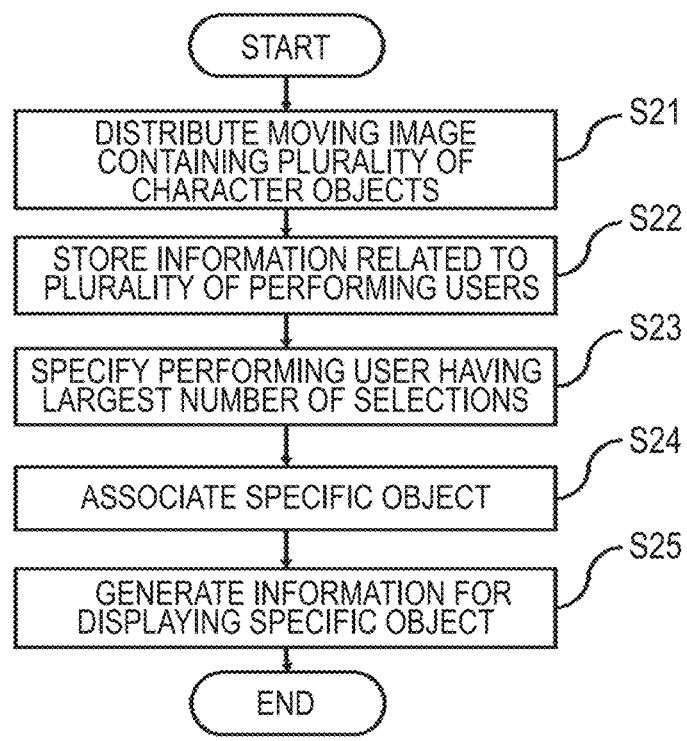
FIG. 41 is a flowchart illustrating an exemplary embodiment of a flow of the information processing method in the first information processing terminal in the disclosure.

As illustrated as an example in FIG. 41, the information processing method according to an exemplary embodiment may be characterized by causing the one or plurality of computer processors included in the first information processing terminal 100 to execute the distribution step S21, the storage step S22, the specification step S23, the association step S24, and the display processing step S25.

The distribution step S21 may distribute a moving image containing a plurality of character objects associated with a plurality of performing users. The distribution step S21 can be executed by the distribution unit 101.

The storage step S22 may store information related to the plurality of performing users. The storage step S22 can be executed by the storage unit 102.

The specification step S23 may specify an performing user associated with a character object corresponding to an object most selected as one object from a plurality of objects corresponding to each of a plurality of character objects from a viewing user terminal of a viewing user viewing the moving image and most selected as one object from a plurality of objects from an performing user terminal of an performing user. The specification step S23 can be executed by the specification unit 103.

The association step S24 may associate a specific object with a character object associated with an performing user specified in the specification step. The association step S24 can be executed by the association unit 104.

The display processing step S25 may generate information for displaying the specific object associated in the association step in association with the character object. The display processing step S25 can be executed by the display processing unit 105.

According to the above configuration, it may be possible to provide a technical improvement that solves or alleviates at least a part of the above-mentioned problems of the conventional art.

Next, a description will be given of the second information processing terminal (guest user terminal) according to an exemplary embodiment of the disclosure.

As illustrated in FIG. 3, the second information processing terminal 110 provided in an exemplary embodiment of the disclosure may be included in the information processing system 3000 that may distribute moving images. The information processing system 3000 further may include the first information processing terminal 100, the third information processing terminal 200, and the information processing apparatus 400 (server apparatus 400).

Figure 42A:
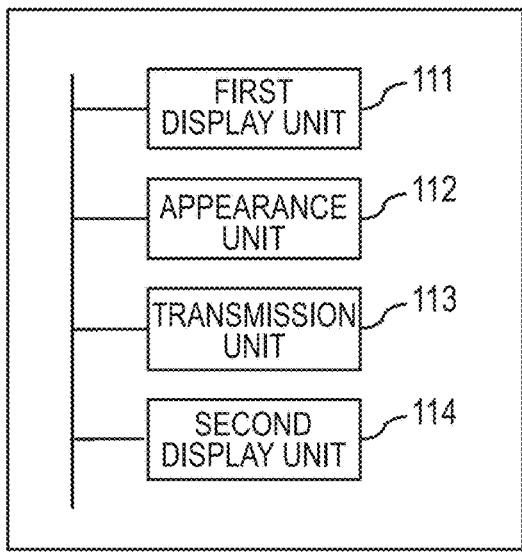
FIG. 42(a) is a configuration diagram illustrating an exemplary embodiment of a functional configuration of a second information processing terminal in the disclosure.
Figure 42B:
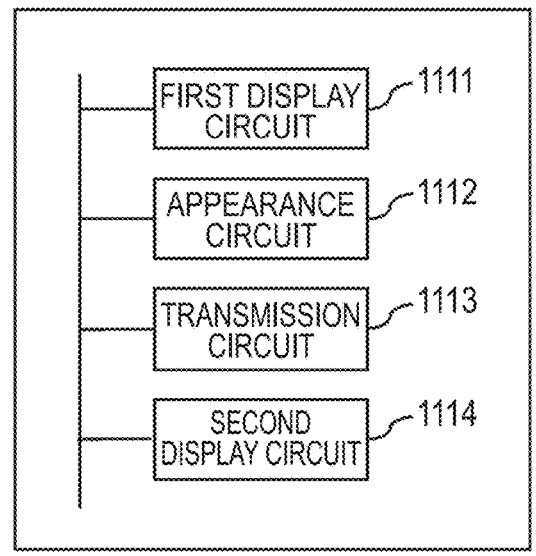
FIG. 42(b) is a circuit configuration diagram illustrating an exemplary embodiment of a circuit configuration for realizing a function of a program for the second information processing terminal in the disclosure.

Further, as illustrated in FIG. 42(a), the second information processing terminal 110 may include a first display unit 111, an appearance unit 112, a transmission unit 113, and a second display unit 114.

The first display unit 111 may display a moving image containing at least one character object associated with at least one performing user. It may be possible to assume that display of such a moving image may be processed by the distribution unit 410.

The appearance unit 112 causes the character object to appear in the moving image displayed on the first display unit 111. A method of causing the character object to appear in such a moving image has been described above in a description field of the collaboration function.

The transmission unit 113 may transmit selection of one object from a plurality of objects corresponding to each of character objects associated with a plurality of performing users. It may be assumed that such selection can be received by the second selection reception unit 430.

The second display unit 114 may display a moving image in which a specific object may be associated with a character object corresponding to an object most selected as one object from a plurality of objects corresponding to each of a plurality of character objects from a viewing user terminal of a viewing user viewing the moving image and most selected as one object from a plurality of objects from an performing user terminal of an performing user. It may be possible to assume that display of such a moving image may be processed by the display processing unit 460.

According to the above configuration, it may be possible to provide a technical improvement that solves or alleviates at least a part of the above-mentioned problems of the conventional art.

Next, a description will be given of a computer program for the guest user terminal according to an exemplary embodiment of the disclosure.

As illustrated in FIG. 3, the computer program according to the exemplary embodiment may be a computer program executed by the second information processing terminal 110 included in the information processing system 3000 that may distribute moving images. The information processing system 3000 further may include the first information processing terminal 100, the third information processing terminal 200, and the information processing apparatus 400 (server apparatus 400).

Further, the computer program causes the one or plurality of computer processors included in the second information processing terminal 110 to implement a first display function, an appearance function, a transmission function, and a second display function.

The first display function may display a moving image containing at least one character object associated with at least one performing user.

The appearance function causes the character object to appear in the moving image displayed by the first display function.

The transmission function may transmit selection of one object from a plurality of objects corresponding to each of character objects associated with a plurality of performing users.

The second display function may display a moving image in which a specific object may be associated with a character object corresponding to an object most selected as one object from a plurality of objects corresponding to each of a plurality of character objects from a viewing user terminal of a viewing user viewing the moving image and most selected as one object from a plurality of objects from an performing user terminal of an performing user.

The above functions can be realized by a first display circuit 1111, an appearance circuit 1112, a transmission circuit 1113, and a second display circuit 1114 illustrated in FIG. 40(*b*). It may be assumed that the first display circuit, the appearance circuit, the transmission circuit, and the second display circuit may be realized by the first display unit 111, the appearance unit 112, the transmission unit 113, and the second display unit 114, respectively. Details of the respective units have been described above.

According to the above configuration, it may be possible to provide a technical improvement that solves or alleviates at least a part of the above-mentioned problems of the conventional art.

Next, a description will be given of an information processing method in the second information processing terminal according to an exemplary embodiment of the disclosure.

As illustrated in FIG. 3, the information processing method of the exemplary embodiment may be an information processing method executed by the second information processing terminal 110 included in the information processing system 3000 that may distribute moving images. The information processing system 3000 further may include the first information processing terminal 100, the third information processing terminal 200, and the information processing apparatus 400 (server apparatus 400).

Figure 43:
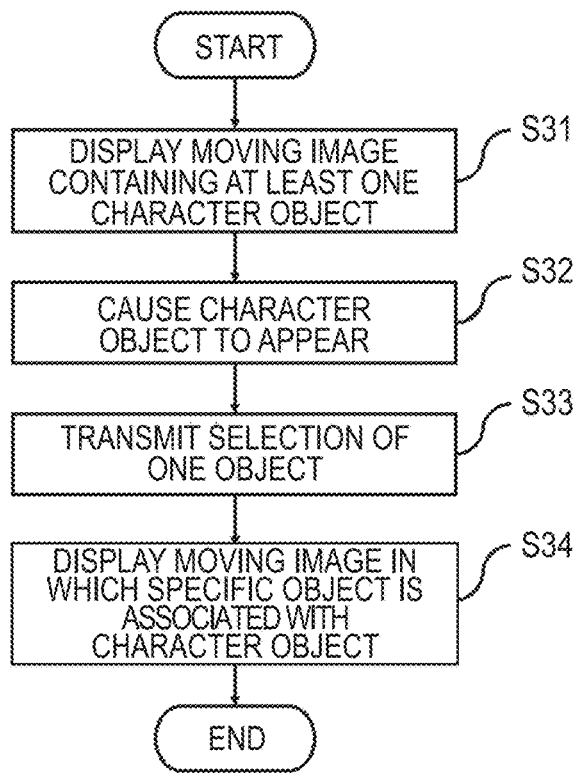
FIG. 43 is a flowchart illustrating an exemplary embodiment of a flow of the information processing method in the second information processing terminal in the disclosure.

As illustrated as an example in FIG. 43, the information processing method provided in an exemplary embodiment may be characterized by causing the one or plurality of computer processors included in the second information processing terminal to execute a first display step S31, an appearance step S32, a transmission step S33, and a second display step S34.

The first display step S31 may display a moving image containing at least one character object associated with at least one performing user. The first display step S31 can be executed by the first display unit 111.

The appearance step S32 causes the character object to appear in the moving image displayed in the first display step S31. The appearance step S32 can be executed by the appearance unit 112.

The transmission step S33 may transmit selection of one object from a plurality of objects corresponding to each of character objects associated with a plurality of performing users. The transmission step S33 can be executed by the transmission unit 113.

The second display step S34 may display a moving image in which a specific object may be associated with a character object corresponding to an object most selected as one object from a plurality of objects corresponding to each of a plurality of character objects from a viewing user terminal of a viewing user viewing the moving image and most selected as one object from a plurality of objects from an performing user terminal of an performing user. The second display step S34 can be executed by the second display unit 114.

According to the above configuration, it may be possible to provide a technical improvement that solves or alleviates at least a part of the above-mentioned problems of the conventional art.

Next, a description will be given of the third information processing terminal (viewing user terminal) according to an exemplary embodiment of the disclosure.

As illustrated in FIG. 3, the third information processing terminal 200 provided in an exemplary embodiment of the disclosure may be included in the information processing system 3000 that may distribute moving images. The information processing system 3000 further may include the first information processing terminal 100, the second information processing terminal 110, and the information processing apparatus 400 (server apparatus 400).

Figure 44A:
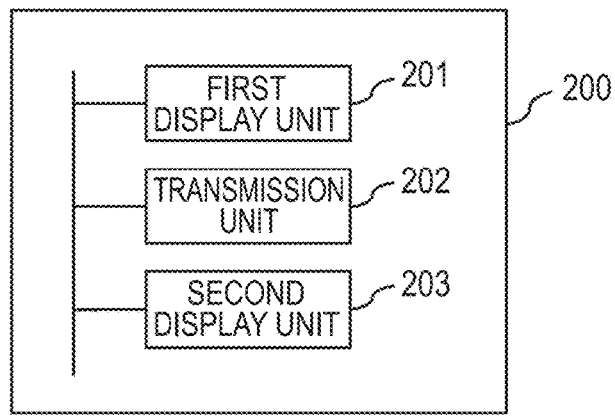
FIG. 44(a) is a configuration diagram illustrating an exemplary embodiment of a functional configuration of a third information processing terminal in the disclosure.

Further, as illustrated in FIG. 44(*a*), the third information processing terminal 200 may be characterized by including a first display unit 201, a transmission unit 202, and a second display unit 203.

The first display unit 201 may display a moving image containing a plurality of character objects associated with a plurality of performing users. It may be possible to assume that display of such a moving image may be processed by the distribution unit 410.

The transmission unit 202 may transmit selection of one object from a plurality of objects corresponding to each of the character objects associated with the plurality of performing users. It may be possible to assume that such selection may be received by the first selection reception unit 420.

The second display unit 203 may display a moving image in which a specific object may be associated with a character object corresponding to an object most selected as one object from a plurality of objects corresponding to each of a plurality of character objects from a viewing user terminal of a viewing user viewing the moving image and most selected as one object from a plurality of objects from an performing user terminal of an performing user. It may be possible to assume that display of such a moving image may be processed by the display processing unit 460.

According to the above configuration, it may be possible to provide a technical improvement that solves or alleviates at least a part of the above-mentioned problems of the conventional art.

Next, a description will be given of a computer program of the third information processing terminal according to an exemplary embodiment of the disclosure.

As illustrated in FIG. 3, the computer program provided in an exemplary embodiment may be a computer program executed by the third information processing terminal 200 included in the information processing system 3000 that may distribute moving images. The information processing system 3000 further may include the first information processing terminal 100, the second information processing terminal 110, and the information processing apparatus 400 (server apparatus 400).

Further, the computer program may be characterized by causing the one or plurality of computer processors included in the third information processing terminal 200 to implement the first display function, the transmission unit function, and the second display function.

The first display function may display a moving image containing a plurality of character objects associated with a plurality of performing users.

The transmission function may transmit selection of one object from a plurality of objects corresponding to each of the character objects associated with the plurality of performing users.

The second display function may display a moving image in which a specific object may be associated with a character object corresponding to an object most selected as one object from a plurality of objects corresponding to each of a plurality of character objects from a viewing user terminal of a viewing user viewing the moving image and most selected as one object from a plurality of objects from an performing user terminal of an performing user.

Figure 44B:
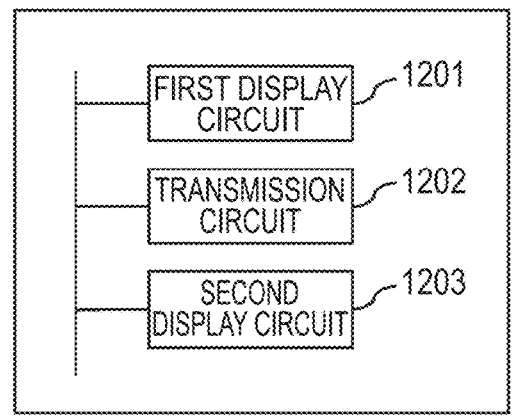
FIG. 44(b) is a circuit configuration diagram illustrating an exemplary embodiment of a circuit configuration for realizing a function of a program for the third information processing terminal in the disclosure.

The above functions can be realized by a first display circuit 1201, a transmission circuit 1202, and a second display circuit 1203 illustrated in FIG. 44(b). It may be assumed that the first display circuit 1201, the transmission circuit 1202, and the second display circuit 1203 may be realized by the first display unit 201, the transmission unit 202, and the second display unit 203, respectively. Details of the respective units have been described above.

According to the above configuration, it may be possible to provide a technical improvement that solves or alleviates at least a part of the above-mentioned problems of the conventional art.

Finally, a description will be given of an information processing method in the third information processing terminal according to an exemplary embodiment of the disclosure.

As illustrated in FIG. 3, the information processing method according to an exemplary embodiment may be an information processing method executed by the third information processing terminal 200 included in the information processing system 3000 that may distribute moving images. The information processing system 3000 further may include the first information processing terminal 100, the second information processing terminal 110, and the information processing apparatus 400 (server apparatus 400).

Figure 45:
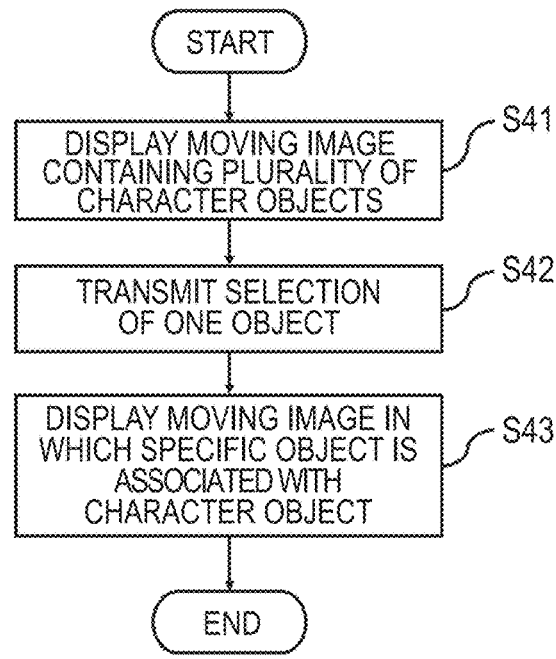
FIG. 45 is a flowchart illustrating an exemplary embodiment of a flow of the information processing method in the third information processing terminal in the disclosure.

As illustrated as an example in FIG. 45, the information processing method provided in an exemplary embodiment may be characterized by causing the one or plurality of computer processors included in the third information processing terminal to execute a first display step S41, a transmission step S42, and a second display step S43.

In the first display step S41, a moving image containing a plurality of character objects associated with a plurality of performing users may be displayed. The first display step S41 can be executed by the first display unit 201.

In the transmission step S42, selection of one object from a plurality of objects corresponding to each of the character objects associated with the plurality of performing users may be transmitted. The transmission step S42 can be executed by the transmission unit 202.

The second display step S43 may display a moving image in which a specific object may be associated with a character object corresponding to an object most selected as one object from a plurality of objects corresponding to each of a plurality of character objects from a viewing user terminal of a viewing user viewing the moving image and most selected as one object from a plurality of objects from an performing user terminal of an performing user. The second display step S43 can be executed by the second display unit 203.

According to the above configuration, it may be possible to provide a technical improvement that solves or alleviates at least a part of the above-mentioned problems of the conventional art.

Further, to function as the server apparatus according to an exemplary embodiment or as a terminal apparatus, an information processing apparatus such as a computer or a mobile phone can be preferably used. Such an information processing apparatus can be realized by storing a program describing processing content that realize each function of the server apparatus according to the embodiment or the terminal apparatus in the storage unit of the information processing apparatus and reading and executing the program by a CPU of the information processing apparatus.

Even though some exemplary embodiments have been described, these embodiments may be presented as examples and may be not intended to limit the scope of the invention. These novel embodiments can be implemented in various other modes, and various omissions, replacements, and may change can be made without departing from the gist of the invention. These embodiments and modifications thereof may be included in the scope and gist of the invention, and may be included in the scope of the invention described in the claims and the equivalent scope thereof.

Further, the method described in the exemplary embodiments may be stored as a program that can be executed by a calculator (computer) in, for example, a recording medium such as a magnetic disk (FLOPPY® disk, hard disk, etc.), an optical disc (CD-ROM, DVD, MO, etc.), or a semiconductor memory (ROM, RAM, flash memory, etc.), or transmitted and distributed by a communication medium. Note that a program stored on the medium side may include a setting program for configuring software means (including not only an execution program but also a table or data structure) to be executed by the calculator in the calculator. The calculator realizing the apparatus may execute the above-mentioned processing by reading a program recorded in the recording medium, and in some cases, constructing software means by a setting program and controlling the operation by this software means. Note that the recording medium mentioned in the specification may not be limited to the one for distribution, and may include a storage medium such as a magnetic disk or a semiconductor memory provided in the calculator or a device connected via a network. The storage unit may function as, for example, a main storage apparatus, an auxiliary storage apparatus, or a cache memory.

Further, all the objects transmitted and received in the information processing system in the disclosure, such as the "gift" and "comment", may be electronic "data".

The "Summary" section may provide description for introducing various selected concepts in a simplified form, and these various concepts may be described later in the "Detailed Description" section. All the trademarks used herein are the property of the holders of these trademarks. The description in the "Summary" section is not intended to specify an important feature or an indispensable feature of the invention described in the claims, and is not intended to limit the technical scope of the invention described in the claims. The above-mentioned or other objects, features, and effects of the invention described in the claims become more apparent from the description in the "Detailed Description" section shown with reference to the accompanying drawings.

A communication line for realizing the network may include a mobile phone network, a wireless network (for example, RF connection via Bluetooth, WiFi (such as IEEE 802.11a/b/n), WiMax, cellular, satellite, laser, and infrared), a fixed telephone network, the Internet, intranet, local area network (LAN), wide area network (WAN), and/or Ethernet network without limitation.

The memories may include a computer-readable medium such as a volatile memory (for example, a register, a cache, or a random access memory (RAM)), a nonvolatile memory (for example, a read-only memory (ROM), an EEPROM, or a flash memory), or a storage (for example, a hard disk drive (HDD), a solid state drive (SSD), a magnetic tape, or an optical medium) without limitation. As may be easily understood, the term "computer-readable recording medium" may include a medium for data storage such as a memory and a storage rather than a transmission medium such as a modulated data signal or a temporary signal.

The specification may be described in the sense of various representative embodiments that are not intended to be limited by any method. As used in this application, singular forms such as "one", "above-mentioned", "above-described", "said", "the", "this", and "that" may include plural forms unless explicitly stated that the singular forms are not the plural forms. In addition, the term "contain" may mean to be "provided" or to "include". Further, the term "coupled", "coupling", "tied", "tying", "connected", or "connecting" may include a mechanical, electrical, magnetic, and optical method for coupling, connecting, or tying objects to each other along with other methods, and does not preclude the presence of an intermediate element between the coupled, coupling, tied, tying, connected, or connecting objects.

The various systems, methods and apparatuses described in the specification should not be construed as being limited by any method. In practice, the disclosure may be aimed at all new features and aspects of each of the various embodiments disclosed, a mutual combination of these various embodiments, and some of these various embodiments combined together. The various systems, methods, and apparatuses described in the specification are not limited to a particular aspect and a particular feature, or a combination of such a particular aspect and particular feature, and the object and the method described in the specification do not require that one or more particular effects exist or that the problem be solved. Furthermore, various features or aspects, or some of the features or aspects in the various embodiments described in the specification may be used in combination with each other.

Operations of some of the various methods disclosed in the specification may be described, for convenience, in a specific order. However, it should be understood that the description in such a manner may include rearranging the order of the above operations unless the specific order may be required by the following specific text. For example, a plurality of sequentially described operations may be rearranged or performed simultaneously in some cases. Furthermore, for the sake of brevity, the accompanying drawings do not indicate various methods in which the various matters and methods described in the specification can be used in conjunction with other matters and methods. In addition, the specification may use terms such as "generate", "cause occurrence", "display", "receive", "evaluate", and "distribute". These terms are high-level descriptions of various actual operations executed. The various actual operations corresponding to these terms may vary depending on the particular implementation and may be readily recognized by those of skill in the art who have the benefit of the disclosure of the specification.

An operation theory, a scientific principle, or other theoretical statements presented in the specification in connection with the apparatuses or the methods of the disclosure may be provided for the purpose of better understanding, and such disclosure is not intended to limit the technical scope. The apparatuses and the methods in the attached claims are not limited to apparatuses and methods that operate by a method described by such an operation theory.

Any of the various methods disclosed in the specification can be implemented using a plurality of instructions, which can be executed by a computer, stored in one or more computer-readable media (for example, a storage medium readable by a non-temporary computer, such as one or more optical media disks, a plurality of volatile memory components, or a plurality of nonvolatile memory components), and executed on the computer. Here, the plurality of volatile memory components may include, for example, a DRAM or an SRAM. Further, the plurality of nonvolatile memory components may include, for example, a hard drive and a solid state drive (SSD). Further, the computer may include any computers available on the market, including, for example, smartphones and other mobile devices having hardware for performing calculations.

Any of a plurality of such computer-executable instructions for implementing the technology disclosed in the specification may be stored in one or more computer-readable media (for example, a non-temporary computer-readable storage media) together with arbitrary data generated and used during implementation of the various embodiments disclosed in the specification. For example, the plurality of such computer-executable instructions may be a part of a separate software application or may be a part of a software application accessed or downloaded via a web browser or other software applications (such as a remote calculating application). For example, such software can be executed on a single local computer (for example, as an agent running on any suitable computer available on the market), or in a network environment (for example, the Internet, a wide area network, a local area network, a client-server network (such as a cloud computing network), or other such networks) using one or more network computers.

For clarity, only particular selected different aspects of various software-based implementations may be described. Other details well known in the art may be omitted. For example, the technology disclosed in the specification is not limited to particular computer language or program. For example, the technology disclosed in the specification can be executed by software written in C, C++, Java, or any other suitable programming language. Similarly, the technology disclosed in the specification is not limited to a particular computer or a particular type of hardware. Particular details of suitable computers and hardware are well known and need not be described in detail in the specification.

Furthermore, any of the various embodiments based on such software (for example, including a plurality of computer-executable instructions for causing the computer to perform any of the various methods disclosed in the specification) can be uploaded and downloaded by suitable communication means, or accessed by a remote method. Such suitable communication means include, for example, the Internet, worldwide web, intranet, software application, cable (including fiber optic cable), magnetic communication, electromagnetic communication (including RF communication, microwave communication, and infrared communication), electronic communication, or other such communication means.

The invention claimed is:

1. An information processing system for distributing a moving image, the information processing system comprising
   a memory, and
   processing circuitry comprising one or a plurality of computer processors,
   wherein the processing circuitry is configured to:
      receive selection of a start object and distribute a moving image containing a plurality of character objects, wherein each user in a plurality of performing users has one character object in the plurality of character objects uniquely associated with said user,
      after distribution of the moving image, enable selection of at least one object from a plurality of objects from each of a viewing user terminal of a viewing user viewing the moving image and a performing user terminal of an object-selecting performing user,
      after enabling selection of the at least one object, receive selection of the at least one object from a plurality of objects from the viewing user terminal of the viewing user viewing the moving image, and store, in the information processing system, a unique correspondence between each object in the plurality of objects and one character object in the plurality of character objects,
      after enabling selection of the at least one object, receive selection of the at least one object from the plurality of objects from the performing user terminal of the object-selecting performing user,
      specify a specified performing user associated with a character object corresponding to an object having received a highest number of selections by the viewing user terminal and the performing user terminal,
      associate a specific object with the character object associated with the specified performing user associated with the character object, and
      generate information for displaying the specific object associated, by the processing circuitry, with the character object.

2. The information processing system according to claim 1, wherein the processing circuitry is further configured to:
   display a result screen showing specified performing user information related to the and selection user information related to a selection, by a selection user comprising at least one of a viewing user and a performing user, of an object corresponding to a character object associated with the specified performing user.

3. The information processing system according to claim 2, wherein the processing circuitry is further configured to display, as the selection user information, at least a part of an icon of the selection user, and a number of objects that have been selected by the selection user.

4. The information processing system according to claim 2, wherein the processing circuitry is further configured to:
   generate and display a first theme based on a request from a performing user terminal of a controlling performing user among the plurality of performing users,
   receive a plurality of answers from performing user terminals of the plurality of performing users following display of the first theme, and
   display one or more answers in the plurality of answers received from the performing user terminals,
   wherein the processing circuitry is configured to display the plurality of objects at positions corresponding to the one or more answers.

5. The information processing system according to claim 4, wherein the processing circuitry is configured to generate the first theme based on information including at least one of:
   a first part extracted from a first database and including a first one or more clauses and
   a second part extracted from a second database and including a second one or more clauses.

6. The information processing system according to claim 4, wherein the processing circuitry is further configured to:
   store information, in the memory, related to the plurality of performing users upon generation and display of the first theme based on a request from the performing user terminal of the controlling performing user among the plurality of performing users.

7. The information processing system according to claim 6, wherein the processing circuitry is configured to, after the result screen is displayed, generate and display a second theme based on a request from a performing user terminal of the controlling performing user, and as a result of generating and displaying the second theme, update information related to the plurality of performing users.

8. The information processing system according to claim 2, wherein the processing circuitry is further configured to post the result screen to an external SNS service, together with information related to the moving image.

9. The information processing system according to claim 1, wherein the processing circuitry is further configured to:
   determine whether or not there is one object that has received the highest number of selections from the viewing terminal of the viewing user and the performing user terminal of the object-selecting performing user,
   wherein when the processing circuitry determines that there is one object having received the highest number of selections, specify one performing user associated with a character object associated with the one object having received the highest number of selections, and when the processing circuitry determines that there is a plurality of objects received having the highest number of selections, specify one performing user according to a predetermined priority from a plurality of performing users associated with character objects associated with the plurality of objects having received the highest number of selections.

10. The information processing system according to claim 1, wherein the processing circuitry is configured to:
start receiving selections in response to a start request from a performing user terminal of a controlling performing user among the performing users, and
end receiving the selections in response to an end request from the performing user terminal of the controlling performing user.

11. The information processing system according to claim 1, wherein the processing circuitry is configured to move the plurality of objects in association with movement of the plurality of character objects.

12. The information processing system according to claim 4,
wherein the plurality of performing users includes a host user distributing the moving image and one or more guest users participating in the moving image, and
the controlling performing user is the host user.

13. An information processing method in an information processing system for distributing a moving image, said information processing system comprising a memory and processing circuitry comprising one or a plurality of computer processors, the information processing method comprising performing, with the processing circuitry, steps of:
receiving selection of a start object;
distributing a moving image containing a plurality of character objects, wherein each user in a plurality of performing users has one character object in the plurality of character objects uniquely associated with said user;
after distribution of the moving image, enabling selection of at least one object from a plurality of objects from each of a viewing user terminal of a viewing user viewing the moving image and a performing user terminal of an object-selecting performing user,
after enabling selection of the at least one object, receiving selection of the at least one object from a plurality of objects from the viewing user terminal of the viewing user viewing the moving image, and storing, in the information processing system, a unique correspondence between each object in the plurality of objects and one character object in the plurality of character objects;
after enabling selection of the at least one object, receiving selection of the at least one object from the plurality of objects from the performing user terminal of each of the performing users;
specifying a specified performing user associated with a character object corresponding to an object having received a highest number of selections from the viewing user terminal and the performing user terminal of each of the performing users;
associating a specific object with the character object associated with the specified performing user; and
generating information for displaying, on a display communicatively coupled to the processing circuitry, the specific object associated with the character object.

14. An information processing method in a first information processing terminal included in an information processing system distributing a moving image, said first information processing terminal comprising a memory and processing circuitry comprising one or a plurality of computer processors, the information processing method comprising performing, with the processing circuitry, steps of:
receiving, on the first information processing terminal, a selection of a start object;
distributing a moving image containing a plurality of character objects, wherein each user in a plurality of performing users has one character object in the plurality of character objects uniquely associated with said user;
storing information related to the plurality of performing users in the memory;
after distribution of the moving image, enabling selection of at least one object from a plurality of objects from each of a viewing user terminal of a viewing user viewing the moving image and a plurality of performing user terminals of the performing users;
specifying a specified performing user associated with a character object corresponding to an object having received a highest number of selections of the at least one object from a plurality of objects, each object in the plurality of objects corresponding uniquely to one character object in the plurality of character objects, from the viewing user terminal of the viewing user viewing the moving image and most selections of one object from the plurality of objects from performing user terminals of the performing users;
associating a specific object with the character object associated with the specified performing user; and
of generating information for displaying, on a display of the first information processing terminal, the specific object associated with the character object.

15. A non-transitory computer-readable medium containing computer program code that, when executed in a first information processing terminal included in an information processing system distributing a moving image, said first information processing terminal comprising a memory and processing circuitry comprising one or a plurality of computer processors, is configured to cause the first information processing terminal to perform steps of:
receiving, on the first information processing terminal, a selection of a start object;
distributing a moving image containing a plurality of character objects, wherein each user in a plurality of performing users has one character object in the plurality of character objects uniquely associated with said user;
after distribution of the moving image, enabling selection of at least one object from a plurality of objects from each of a viewing user terminal of a viewing user viewing the moving image and a plurality of performing user terminals of the performing users;
storing information related to the plurality of performing users in the memory;
specifying a specified performing user associated with a character object corresponding to an object having a highest first number of selections of the at least one object from a plurality of objects, each object in the plurality of objects corresponding uniquely to one character object in the plurality of character objects, from the viewing user terminal of the viewing user viewing the moving image and a highest second number of selections of one object from the plurality of objects from the performing user terminals of the performing users;
associating a specific object with the character object associated with the specified performing user; and generating information for displaying, on a display of the first information processing terminal, the specific object associated by the association function in association with the character object.

16. An information processing method in a second information processing terminal included in an information processing system distributing a moving image, said second information processing terminal comprising a memory and processing circuitry comprising one or a plurality of computer processors, the information processing method comprising performing, with the processing circuitry, steps of:
   receiving, on the second information processing terminal, a selection of a start object;
   displaying a moving image containing one or more character objects associated with one or more performing users, wherein each user in the one or more performing users has one object in the one or more character objects uniquely associated with said user;
   causing the one or more character objects to appear in the moving image;
   after distribution of the moving image, enabling selection, from the second user terminal, of at least one object from a plurality of objects in the moving image,
   after enabling the selection, receiving the selection of the at least one object selected from the plurality of objects, and transmitting the selection of the at least one object selected from the plurality of objects, each of the plurality of objects corresponding uniquely to one character object in a plurality of character objects associated with a plurality of performing users; and
   displaying, on a display of the second information processing terminal, a second moving image in which a specific object is associated with the character object corresponding to the object having received a first highest number of selections of one object from the plurality of objects from a viewing user terminal of a viewing user viewing the second moving image and a second highest number of selections of one object from the plurality of objects from performing user terminals of the performing users.

17. A non-transitory computer-readable medium containing computer program code that, when executed in a second information processing terminal included in an information processing system distributing a moving image, said second information processing terminal comprising a memory and processing circuitry comprising one or a plurality of computer processors, is configured to cause the processing circuitry of the second information processing terminal to perform steps of:
   receiving, on the second information processing terminal, a selection of a start object;
   displaying a moving image containing one or more character objects associated with one or more performing users, wherein each user in the one or more performing users has one object in the one or more character objects uniquely associated with said user;
   causing the one or more character objects to appear in the moving image;
   after distribution of the moving image, enabling selection, from the second user terminal, of at least one object from a plurality of objects in the moving image,
   after enabling selection, receiving the selection of the at least one object selected from the plurality of objects, and transmitting the selection of the at least one object selected from a plurality of objects, each of the plurality of objects corresponding uniquely to one character object in a plurality of character objects associated with a plurality of performing users; and
   displaying, on a display of the second information processing terminal, a second moving image in which a specific object is associated with the character object corresponding to the object having received a first highest number of selections of one object from the plurality of objects from a viewing user terminal of a viewing user viewing the second moving image and a second highest number of selections of one object from the plurality of objects from performing user terminals of the performing users.

18. An information processing method in a third information processing terminal included in an information processing system distributing a moving image, said third information processing terminal comprising a memory and processing circuitry comprising one or a plurality of computer processors, the information processing method comprising performing, with the processing circuitry, steps of:
   receiving, on the third information processing terminal, a selection of a start object;
   displaying the moving image containing a plurality of character objects, wherein each user in a plurality of performing users has one object in the plurality of character objects uniquely associated with said user;
   after distribution of the moving image, enabling selection, from the third user terminal, of at least one object from a plurality of objects in the moving image,
   after enabling the selection, receiving the selection of the at least one object selected from the plurality of objects, and transmitting selection of the at least one object selected from the plurality of objects, each of the plurality of objects corresponding uniquely to one character object in the plurality of character objects associated with the plurality of performing users; and
   displaying, on a display of the third information processing terminal, a second moving image in which a specific object is associated with a character object corresponding to an object having received a highest first number of selections of one object from the plurality of objects from a viewing user terminal of a viewing user viewing the second moving image and a highest second number of selections of one object from the plurality of objects from performing user terminals of the performing users.

19. A non-transitory computer-readable medium comprising computer program code that, when executed in a third information processing terminal included in an information processing system distributing a moving image, said third information processing terminal comprising a memory and processing circuitry comprising one or a plurality of computer processors, is configured to cause the processing circuitry of the third information processing terminal to perform steps of:
   receiving, on the third information processing terminal, a selection of a start object;
   displaying the moving image containing a plurality of character objects, wherein each user in a plurality of performing users has one object in the plurality of character objects uniquely associated with said user;
   after distribution of the moving image, enabling selection, from the third user terminal, of at least one object from a plurality of objects in the moving image,
   after enabling the selection, receiving the selection of the at least one object selected from the plurality of objects, and transmitting selection of the at least one object selected from the plurality of objects, each of the plurality of objects corresponding uniquely to one character object in the plurality of character objects associated with the plurality of performing users; and
displaying, on a display of the third information processing terminal, a second moving image in which a specific object is associated with a character object corresponding to an object having received a highest first number of selections of one object from the plurality of objects from a viewing user terminal of a viewing user viewing the second moving image and a highest second number of selections of one object from the plurality of objects from performing user terminals of the performing users.

\* \* \* \* \*